(12) United States Patent
Akamatsu

(10) Patent No.: US 11,195,076 B2
(45) Date of Patent: Dec. 7, 2021

(54) RF TAG

(71) Applicant: TOYO SEIKAN GROUP HOLDINGS, LTD., Tokyo (JP)

(72) Inventor: Shinya Akamatsu, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 16/647,388

(22) PCT Filed: Aug. 10, 2018

(86) PCT No.: PCT/JP2018/030079
§ 371 (c)(1),
(2) Date: Mar. 13, 2020

(87) PCT Pub. No.: WO2019/064964
PCT Pub. Date: Apr. 4, 2019

(65) Prior Publication Data
US 2021/0019587 A1 Jan. 21, 2021

(30) Foreign Application Priority Data

Sep. 29, 2017 (JP) .............................. JP2017-190694

(51) Int. Cl.
*G06K 19/077* (2006.01)
*H01Q 1/22* (2006.01)
*H01Q 7/00* (2006.01)

(52) U.S. Cl.
CPC ..... *G06K 19/07745* (2013.01); *H01Q 1/2283* (2013.01); *H01Q 7/00* (2013.01)

(58) Field of Classification Search
CPC ... G06K 19/07745; H01Q 1/2283; H01Q 7/00
(Continued)

(56) References Cited

U.S. PATENT DOCUMENTS 9,680,512 B2 * 6/2017 Chen ...................... H04J 11/00
2011/0204147 A1 * 8/2011 Amadeo .......... G06K 19/07781
235/492

(Continued)

FOREIGN PATENT DOCUMENTS

DE 202016101289 U1 4/2016
EP 3217566 A1 9/2017

(Continued)

OTHER PUBLICATIONS

PCT/ISA/210, "International Search Report for International Application No. PCT/JP2018/030079," dated Oct. 16, 2018.

(Continued)

*Primary Examiner* — Michael G Lee
*Assistant Examiner* — David Tardif
(74) *Attorney, Agent, or Firm* — Manabu Kanesaka

(57) ABSTRACT

The present invention improves the communication characteristics of an inlay using an auxiliary antenna, while protecting the inlay from physical and mechanical external forces, shocks or the like, without being subjected to the constraints of a dipole antenna. To that end, the present invention has a configuration, including: an inlay having an IC chip and only a loop circuit antenna, on which the IC chip is mounted, and not including another antenna; a casing for accommodating the inlay therein; and a planar top cover covering one surface side of the casing. The top cover is formed of a prescribed metallic material and includes a cutout opening at least on one side. The inlay is disposed in the casing so as to be positioned inside the cutout. The top cover functions as an antenna of the inlay by being electrically connected to the inlay.

19 Claims, 10 Drawing Sheets

(58) Field of Classification Search
USPC .......................................................... 235/492
See application file for complete search history.

(56) References Cited

U.S. PATENT DOCUMENTS

| | | | | |
|---|---|---|---|---|
| 2011/0284643 | A1* | 11/2011 | Yamagajo | H01Q 9/0457 |
| | | | | 235/492 |
| 2013/0214986 | A1* | 8/2013 | Zhu | H01Q 1/243 |
| | | | | 343/848 |
| 2014/0361086 | A1 | 12/2014 | Finn et al. | |
| 2015/0108221 | A1* | 4/2015 | Akamatsu | H01Q 1/2225 |
| | | | | 235/488 |
| 2015/0108222 | A1 | 4/2015 | Shimizu et al. | |
| 2018/0039878 | A1 | 2/2018 | Akamatsu et al. | |
| 2018/0060718 | A1 | 3/2018 | Akamatsu et al. | |
| 2018/0294570 | A1* | 10/2018 | Stowell | H01Q 1/36 |

FOREIGN PATENT DOCUMENTS

| | | |
|---|---|---|
| JP | 2007-135183 A | 5/2007 |
| JP | 2008-123196 A | 5/2008 |
| JP | 2011-204130 A | 10/2011 |
| JP | 2014-006810 A | 1/2014 |
| JP | 2014-223756 A | 12/2014 |
| WO | 2016/170750 A1 | 10/2016 |
| WO | 2016/170752 A1 | 10/2016 |

OTHER PUBLICATIONS

PCT/ISA/237, "Written Opinion of the International Searching Authority for International Application No. PCT/JP2018/030079," dated Oct. 16, 2018.
Europe Patent Office, "Search Report for European Patent Application No. 18863417.4," dated May 14, 2021.
Japan Patent Office, "Office Action for Japanese Patent Application No. 2017-190694," dated Aug. 10, 2021.

* cited by examiner

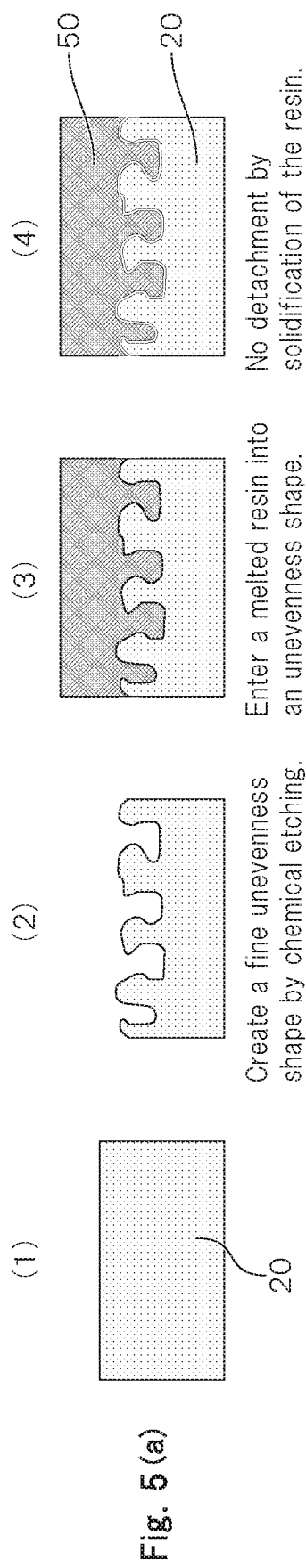
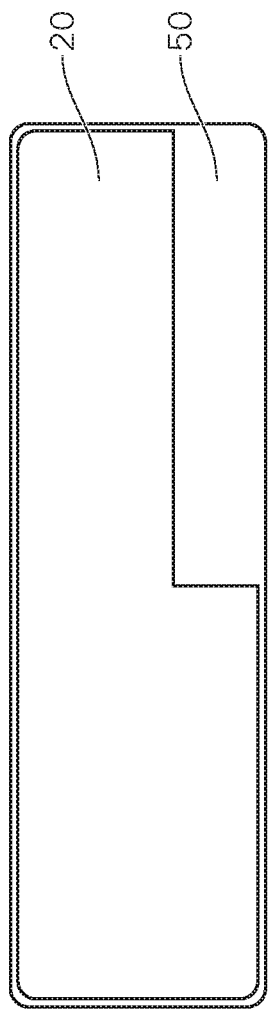
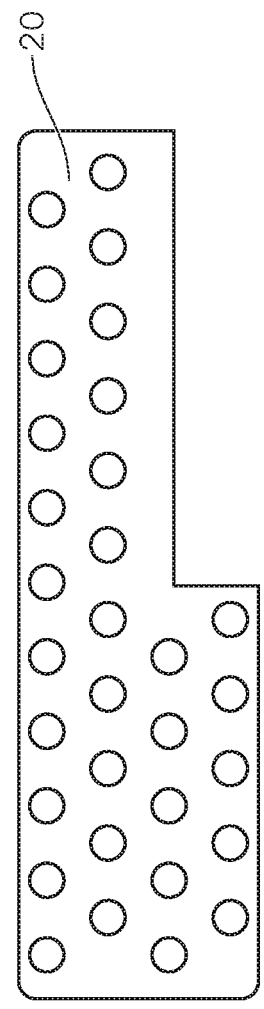
Fig. 5(a)
Fig. 5(b)
Fig. 5(c)

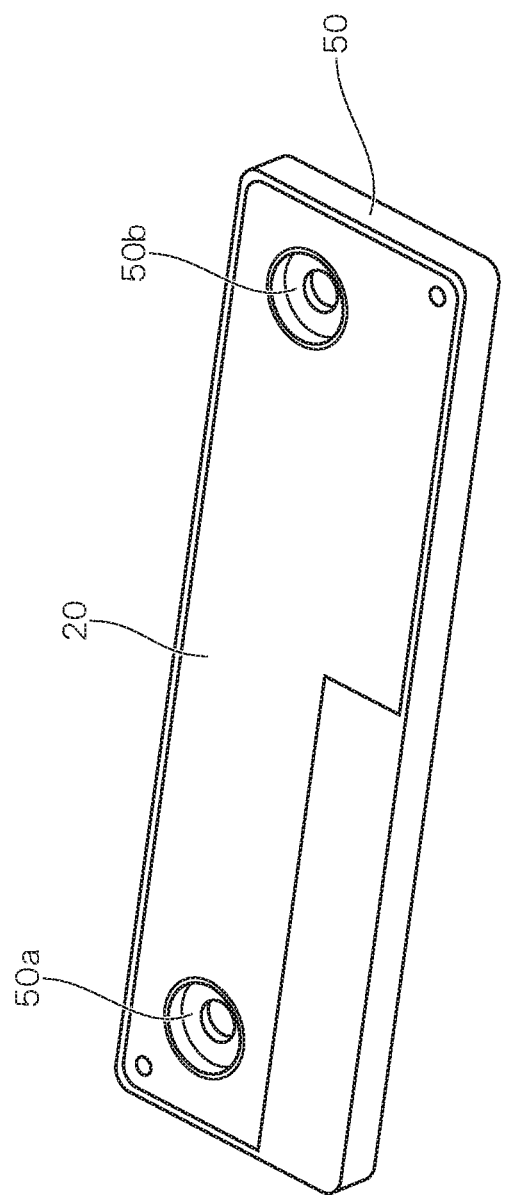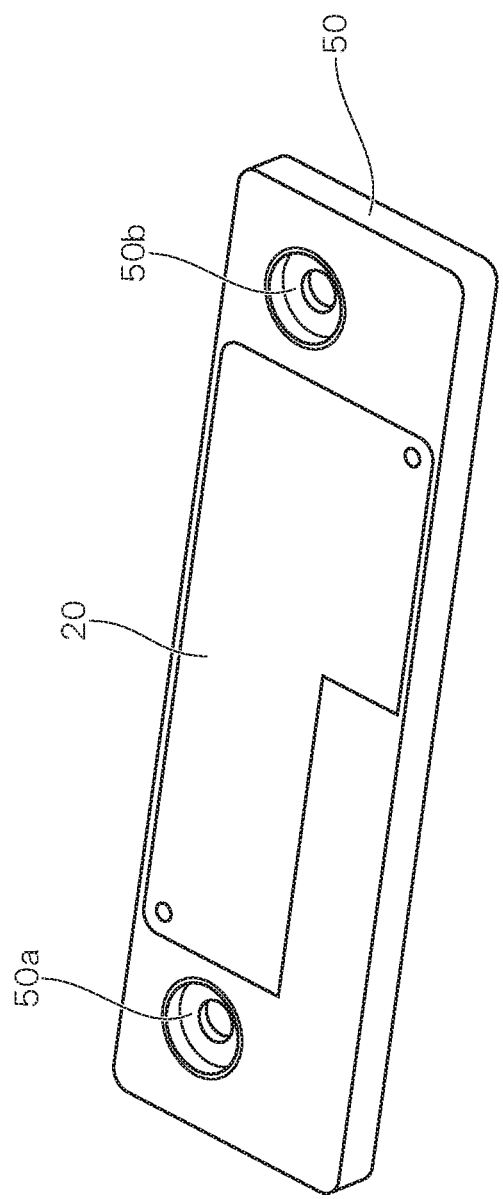

RF TAG

RELATED APPLICATIONS

The present application is National Phase of International Application No. PCT/JP2018/030079 filed Aug. 10, 2018, and claims priority from Japanese Application No. 2017-190694, filed Sep. 29, 2017, the disclosure of which is hereby incorporated by reference herein in its entirety.

TECHNICAL FIELD

The present invention relates to an RF tag mounted to an optional item or object, for example, such as a pallet and a container for freight and the like, and used, in particular, to an RF tag for accommodating an inlay having an IC chip and an antenna in a casing or the like to protect the inlay.

BACKGROUND ART

In general, for an optional item or object, a so-called RF tag having a built-in IC chip storing prescribed information on the item or the object to be readable and writable has been widely used.

The RF tag is also called an RFID (radio frequency identification) tag, an IC tag, a contactless tag or the like, and is an ultra-small communication terminal prepared by forming, into a tag (baggage tag) shape, a so-called inlay (inlet) in which an electronic circuit having the IC chip and a radio antenna is sealed and coated with a substrate such as a resin film and the like, in which read or write, or read and write (read only, write once, read/write) of prescribed information are configured to be able to be performed from or to the IC chip in the tag by radio by means of an interrogator (reader/writer).

Then, the prescribed information is written into such an RF tag, and the RF tag is mounted to the optional item, object or the like. Thus, the information recorded on the RF tag is picked up by the reader/writer. Thus, the information recorded on the tag can be identified, output, indicated, updated or the like as the prescribed information on the item.

In such an RF tag, hundreds of bits to several kilobits of data are recordable in a memory in the IC chip, and a sufficient amount of information can be recorded as the information on the item or the like, and communication can be performed with a side of the interrogator in a contactless manner. Therefore, neither wear nor scratch nor dirt or the like of a contact is worried about, and further the tag per se can be formed into no power supply. Therefore, processing, size reduction and thickness reduction according to the object can be achieved.

Various information on the item to which the tag is mounted, for example, various information such as a name, an identification symbol, contents, a component, a manager, a user, a use state, a use condition and the like become recordable therein by using such an RF tag, and a wide variety of information which has been unable to be recorded with a character, a barcode or the like to be printed and indicated on a label surface can be accurately read and written only by mounting a size-reduced and weight-reduced tag onto the item.

Here, in such an RF tag, the RF tag to which the C chip and the antenna are only film-coated, which is called a general-purpose inlay (inlet), has been widely used. The inlay of this kind is small and thin, and can be easily mounted onto any object without taking a place, and can be immediately used as the RF tag, and therefore has been widely used in recent years.

However, in such a general-purpose inlay, the IC chip and the antenna are only film-coated, and therefore, in a state as it is, failure, malfunction, damage or the like is caused by shocks or the like applied from outside. For example, a pallet, a container or the like for freight is constantly in a state in which physical and mechanical external forms and shocks are applied thereto, and in the case of the RF tag which is used by being mounted to such an object, the RF tag has been easily liable to cause failure, damage or the like in an intact state as the inlay.

Therefore, in such an RF tag to be used under an environment in which external forces are easily applied thereto, the general-purpose inlay is accommodated in a prescribed cover, case, casing or the like. Thus, the inlay is protected from physical and mechanical shocks or the like.

For example, Patent Document 1 proposes an RFID tag in which the general-purpose inlay is interposed between protective metallic plates in a cross sectional U-shape and protected.

Moreover, Patent Document 2 proposes an RFID tag in which the general-purpose inlay sealed with a non-conductive material is buried into a hollow slot of a metallic holder.

The general-purpose inlay is thus accommodated and sealed into a protective plate or a holder. Thus, the inlay can be protected from a surrounding environment, and the inlay can be protected so as not to easily cause failure, damage or the like even by physical and mechanical external forces, shocks, collisions or the like applied from outside, in particular.

RELATED ART DOCUMENTS

Patent Documents

Patent Document 1: JP-A-2011-204130
Patent Document 2: JP-A-2007-135183

SUMMARY OF THE INVENTION

Problems to be Solved by the Invention

However, according to the technologies proposed in Patent Documents 1 and 2, no consideration has been made on a dipole antenna provided in a general-purpose inlay.

As a basic configuration, the general-purpose inlay has: an IC chip; a loop circuit antenna to be disposed in the vicinity of a surrounding of the IC chip; and a dipole antenna formed of a conductor linearly extending in right and left of the IC chip (loop circuit antenna).

In the dipole antenna, the conductor constituting the antenna is formed to be symmetrical on both sides of the IC chip so as to have a length of ½ wavelength, for example.

Therefore, when the general-purpose inlay is directly used, a space in which at least a length of the dipole antenna can be disposed and accommodated is required.

In the technologies according to Patent Documents 1 and 2, no consideration has been made on the dipole antennas as described above, and only a structure in which the inlay is wholly accommodated in a metal protective plate or holder has been formed.

Therefore, a dimension of the metal protective plate or holder including the inlay requires a size exceeding the length (for example, ½ wavelength) of the dipole antenna of the inlay, which has been a factor of hindering size reduction, a degree of freedom of design of an RF tag, or the like.

Moreover, in Patent Documents 1 and 2, no consideration has been made on further having an auxiliary antenna to the general-purpose inlay.

When the general-purpose inlay is used as the RF tag, the auxiliary antenna is further laminated. Thus, a radio communication distance of the general-purpose inlay can be further increased, or radio communication in an optional frequency band can be performed.

However, if such an inlay and an auxiliary antenna are directly accommodated in the metal protective plate or holder as proposed in Patent Documents 1 and 2, the inlay and the auxiliary antenna are wholly electrically shielded and blocked by a metal case, resulting in occurrence of a problem of incapability of effectively functioning the auxiliary antenna.

The applicant of the present application and the inventors have arrived at as a result of the diligent study the invention of an RF tag in which radio communication of an inlay can be favorably performed by utilizing a function of an auxiliary antenna while accommodating the inlay in a casing or the like to protect the inlay from a surrounding environment without being subjected to constraints of a dimension of a dipole antenna of the inlay.

More specifically, the present invention has been proposed in order to solve a problem of the conventional technology as described above, and relates to an RF tag in which an inlay having an IC chip and a loop circuit antenna, and not having a dipole antenna is accommodated in a prescribed position of a casing or the like, and the inlay has a metal top cover which functions as an auxiliary antenna of the inlay accommodated in the casing or the like. Thus, communication characteristics of the inlay can be improved by using the auxiliary antenna while protecting the inlay from physical and mechanical external forces, shocks or the like without being subjected to constraints of the dipole antenna.

Means for Solving the Problems

In order to achieve the above-described object, an RF tag of the present invention is formed into a configuration, comprising: an inlay comprising an IC chip and only a loop circuit antenna, on which the IC chip is mounted, and not comprising another antenna; a casing for accommodating the inlay therein; and a planar top cover covering one surface side of the casing, wherein the top cover is formed of a prescribed metallic material and comprises a cutout opening at least on one side, and the inlay is disposed in the casing so as to be positioned inside the cutout, and the top cover functions as an antenna of the inlay by being electrically connected to the inlay.

Advantageous Effects of the Invention

According to the present invention, an inlay having an IC chip and a loop circuit antenna, and not having a dipole antenna is accommodated in a prescribed position of a casing or the like, and the inlay has a metal top cover which functions as an auxiliary antenna of the inlay accommodated in the casing or the like. Thus, communication characteristics of the inlay can be improved by using the auxiliary antenna while protecting the inlay from physical and mechanical external forces, shocks or the like without being subjected to constraints of the dipole antenna.

Accordingly, the present invention can be preferably used as an RF tag for an object in which physical forces or shocks are applied from outside in many cases while ensuring size reduction or a degree of freedom of design of the RF tag.

BRIEF DESCRIPTION OF THE DRAWINGS

FIGS. 1(a) and 1(b) are perspective views showing an RF tag according to a first embodiment of the present invention, in a completed state in which an inlay is accommodated in a casing, in which FIG. 1(a) shows a state viewed from a side of a plane surface of the casing, and FIG. 1(b) shows a state viewed from a bottom surface side of the casing.

FIGS. 4(b) to 4(d) show a cross-sectional view of the RF tag according to the first embodiment of the present invention, in which FIG. 4(b) shows an exploded state, FIG. 4(c) shows an assembled state, and FIG. 4(d) shows a state mounted to an object.

FIGS. 5(a), 5(b) and 5(c) are explanatory diagrams schematically showing a bonding method of the top cover and the casing of the RF tag according to the first embodiment of the present invention, in which FIG. 5(a) shows a cross-sectional view when a surface of a metallic plate constituting the top cover is subjected to chemical conversion, FIG. 5(b) shows a plan view when a surrounding of the top cover is covered with a resin constituting the casing, and FIG. 5(c) is a plan view when a plurality of holes are provided on a surface of the top cover.

FIGS. 6(a) and 6(b) are explanatory diagrams schematically showing a structure in which a top cover and an mounting object in the RF tag according to the first embodiment of the present invention are fixed while insulating both, in which FIG. 6(a) shows a case where a hole is provided in the top cover to cover a surrounding of the hole with a resin constituting a casing, and FIG. 6(b) shows a case where the casing is formed in a size larger than the top cover to provide a hole in the casing.

FIGS. 7(a) and 7(b) are explanatory diagrams schematically showing a configuration pattern of the casing of the RF tag according to the first embodiment of the present invention, in which FIG. 7(a) shows a case where an inlay is completely accommodated and sealed inside the casing, and FIG. 7(b) shows a case where the inlay is accommodated and disposed in the casing opening on a bottom surface side.

MODE FOR CARRYING OUT THE INVENTION

Hereinafter, an embodiment of an RF tag according to the present invention will be described with reference to drawings.

First Embodiment

Figure 1:
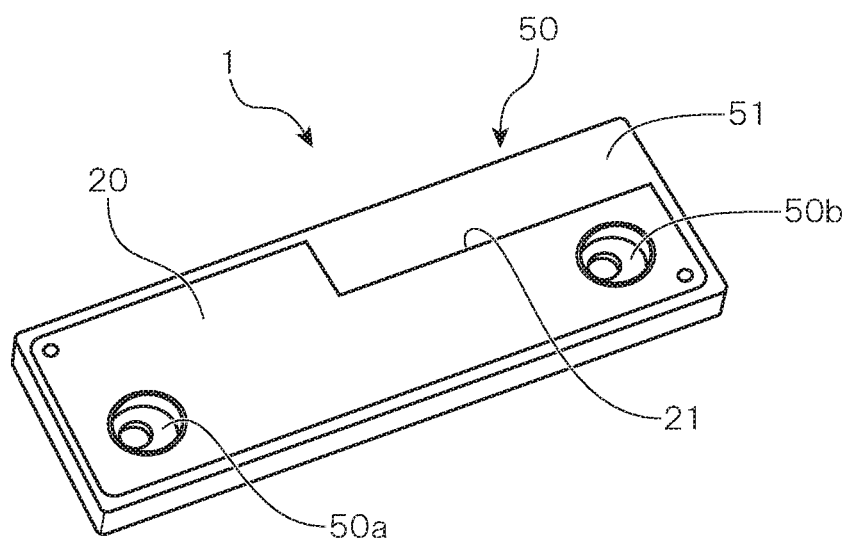
Figure 1:
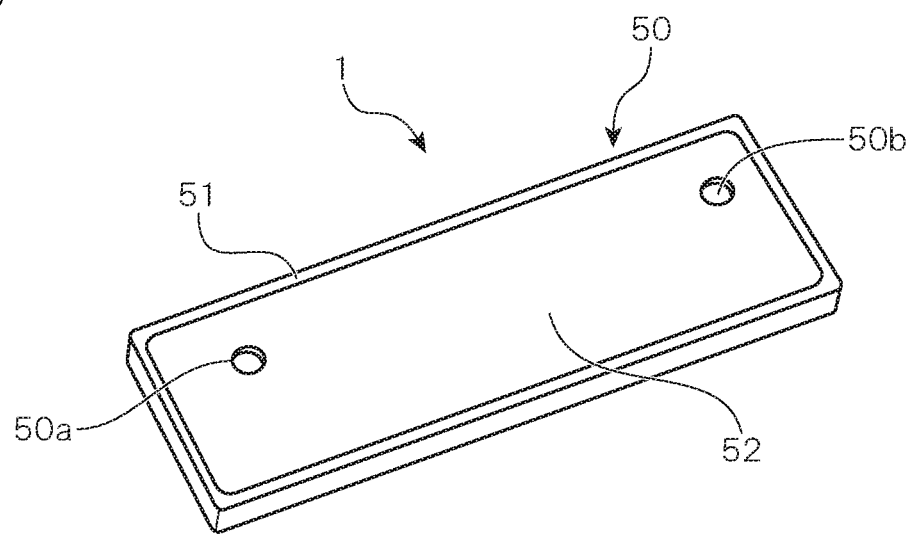
Figure 2:
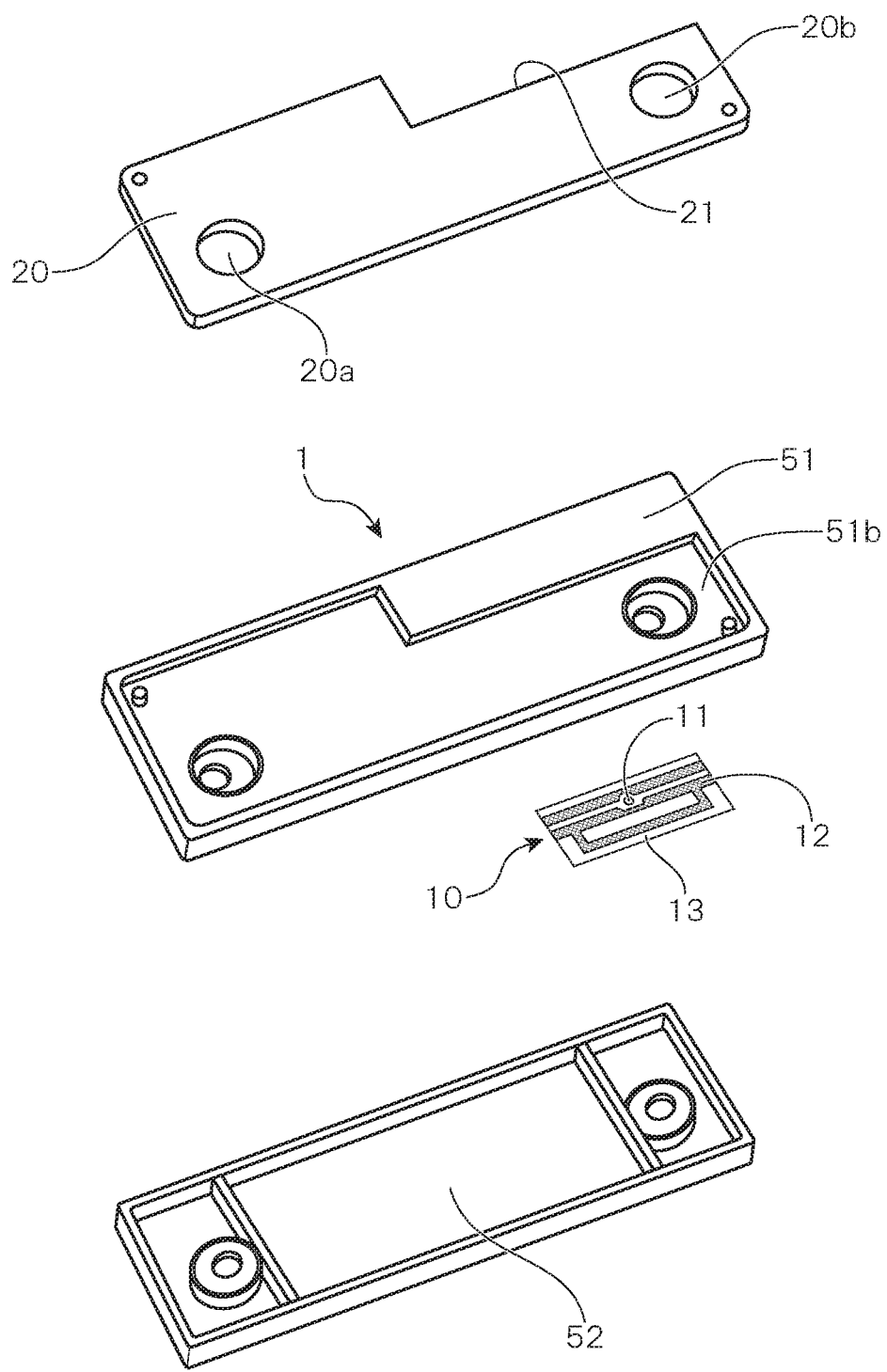
FIG. 2 is a perspective view in a state in which all of a top cover, a top surface side protective member, an inlay and a bottom surface side protective member, constituting the RF tag shown in FIG. 1(a), are exploded.
Figure 3:
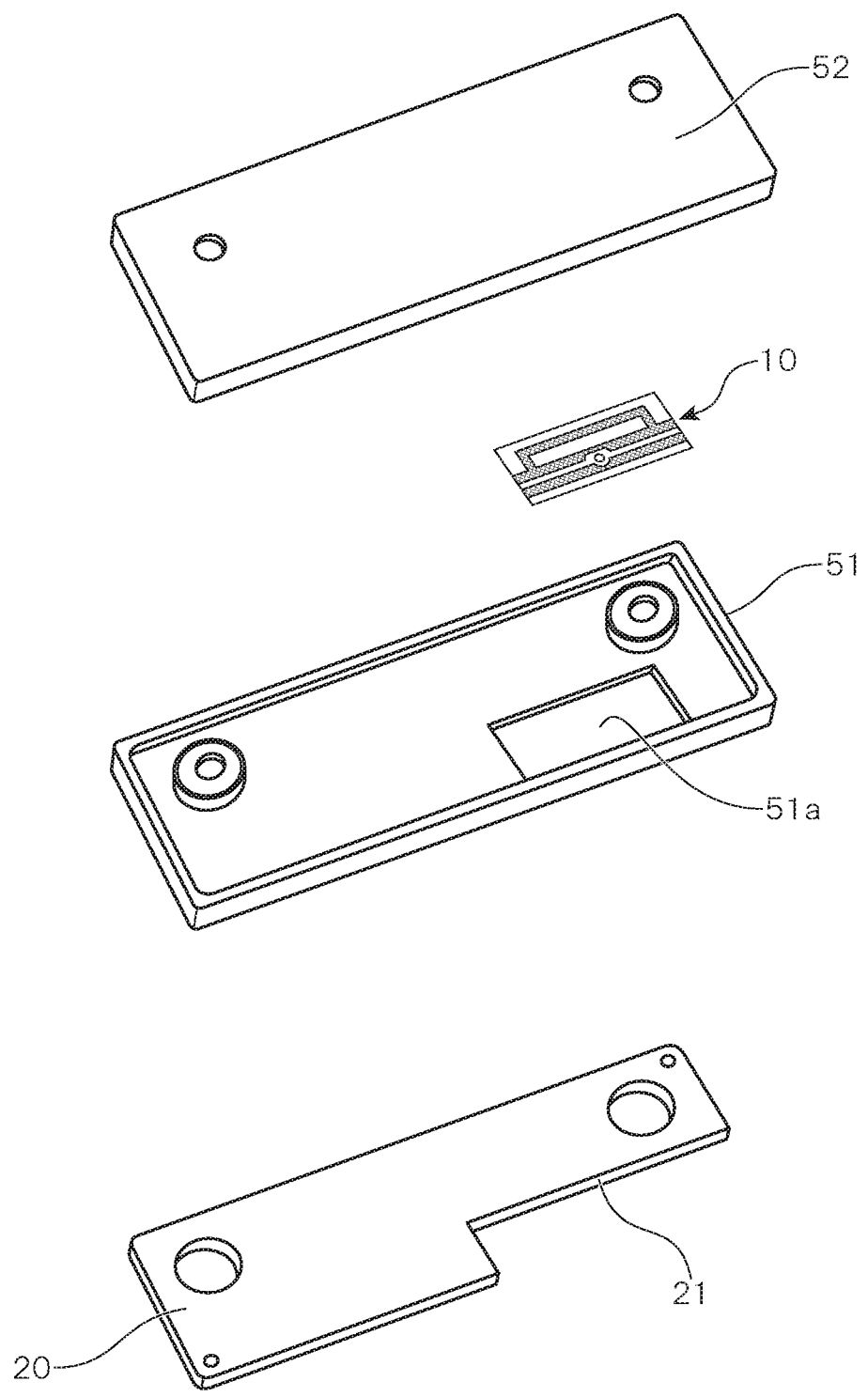
FIG. 3 is an exploded perspective view in which upper and lower (top and tail) are inverted in the exploded perspective view shown in FIG. 2.

FIGS. 1(a) and 1(b) are perspective views showing an RF tag 1 according to a first embodiment of the present invention, in a completed state in which an inlay 10 is accommodated in a casing 50, and FIG. 2 and FIG. 3 are an exploded perspective view of the RF tag 1 shown in FIGS. 1(a) and 1(b) according to the present embodiment.

Figure 4A:
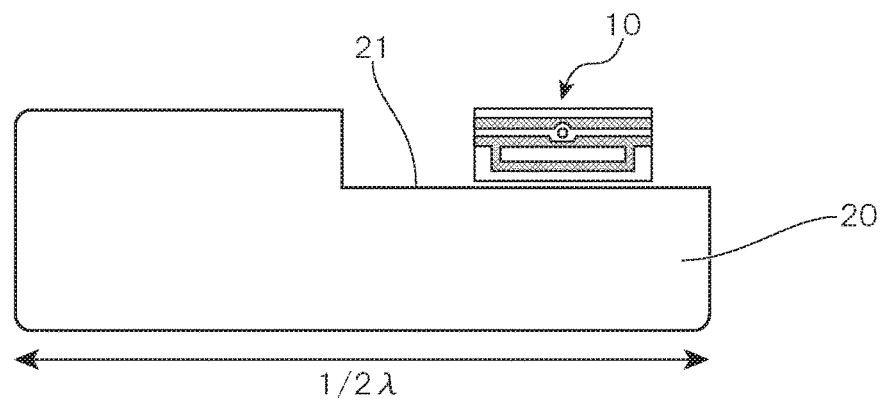
FIG. 4(a) is a plan view schematically showing a disposition relationship between the top cover and the inlay in the RF tag according to the first embodiment of the present invention.
Figure 4B:
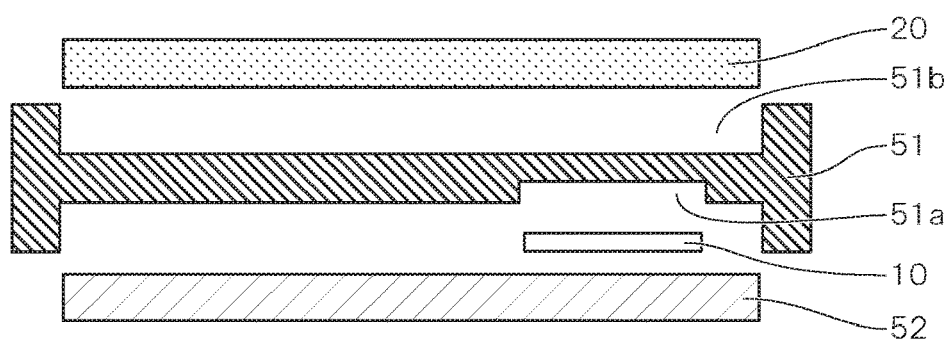
Figure 4C:
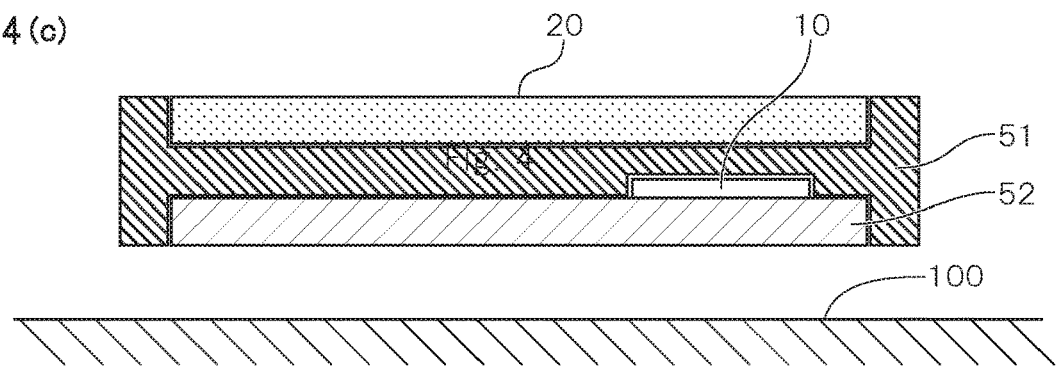
Figure 4D:
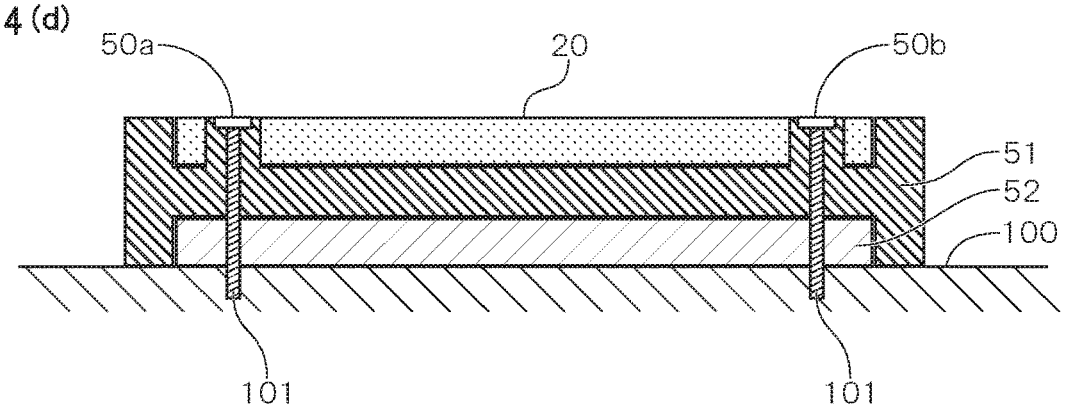

Moreover, FIG. 4(a) is a plan view showing a disposition relationship between a top cover 20 and an inlay 10, and FIGS. 4(b) to 4(d) are a cross-sectional view of the RF tag 1.

As shown in these drawings, the RF tag 1 according to the present embodiment is an RF tag having a structure in which the inlay 10 constituting the RF tag performing radio communication is accommodated and protected in the casing 50, in which the inlay 10 is protected by the casing 50 from an external environment. In particular, in the present embodiment, the top cover 20 to be disposed on at least one surface (top surface) of the casing 50 for accommodating the inlay 10 is formed of a metallic member. Thus, durability, shock resistance, pressure resistance and the like against physical forces such as shocks, pressure and the like applied to the casing 50 from outside are improved. Thus, the inlay 10 is prevented from causing failure, damage or the like by external forces or shocks.

Then, in the present embodiment such a top cover 20 is functioned as an antenna of the inlay 10 not having a dipole antenna, to be disposed in the casing 50. Thus, communication characteristics of the RF tag 1 are configured to be maintained and improved in a favorable state.

Specifically, as shown in FIG. 2, the RF tag 1 according to the present embodiment is configured of: an inlay 10 having an IC chip 11 and only a loop circuit antenna 12; a casing 50 (51, 52) for accommodating the inlay 10 therein as a protective means for protecting this inlay 10; and a top cover 20 disposed on one surface of the casing 50 to function as an antenna of the inlay 10 to be accommodated in the casing 50.

Hereinafter, each unit will be described in detail.

[Inlay]

The inlay 10 constitutes the RF tag in which reading or writing, or reading and writing of prescribed information are performed from or to a reader/writer (interrogator) (not shown) by radio, and has a type such as a read only type, a write once type, a read/Write type and the like, for example.

Specifically, the inlay 10 has the IC chip 11 and the loop circuit antenna 12, on which the IC chip 11 is mounted, and the IC chip 11 and the loop circuit antenna 12 are mounted and formed on one seal film 13 formed of a PET resin or the like, for example, serving as a substrate, and then another seal film 13 is stacked thereon. Thus, the inlay 10 is sealed and protected in a state in which both are interposed with two seal films 13.

Then, in the present embodiment, the inlay 10 is configured not to have an antenna other than the loop circuit antenna 12.

The inlay in general is provided with the dipole antenna formed of a conductor linearly extending on both sides (right and left) of the IC chip 11.

The dipole antenna is provided so that the conductor constituting the antenna may become symmetrical on both sides of the IC chip so as to have a length of ½ wavelength, for example. Therefore, when a general-purpose inlay is directly used, a space in which at least a length of the dipole antenna can be disposed and accommodated is required, and therefore a dimension of the casing including the inlay or the like requires a size exceeding the length (for example, ½ wavelength) of the dipole antenna to constitute a factor of hindering size reduction, a degree of freedom of design of the RF tag, or the like.

Moreover, when an auxiliary antenna is further provided for the inlay having the dipole antenna, impedance matching cannot be achieved between the dipole antenna and the auxiliary antenna, and therefore the auxiliary antenna cannot be effectively functioned in several cases.

Consequently, in the present embodiment, the inlay 10 is formed into a configuration having the IC chip 11 and only the loop circuit antenna 12, and not having any other antenna including the dipole antenna. Thus, radio communication of the inlay is able to be favorably performed by effectively utilizing the function of the auxiliary antenna without being subjected to the constraints of the dipole antenna.

Here, the inlay 10 not having the dipole antenna can be configured by cutting and removing a part of the dipole antenna by using the general-purpose inlay having the dipole antenna, for example.

Moreover, such an inlay 10 can also be configured by producing a dedicated inlay having the IC chip 11 and only the loop circuit antenna 12.

The IC chip 11 is formed of a semiconductor chip such as a memory and the like, in which hundreds of bits to several kilobits of data can be recorded, for example.

The loop circuit antenna 12 is configured, in which a loop-shaped circuit conductor is connected so as to surround the vicinity of the surrounding of the IC chip 11. Impedance matching of the IC chip 11 is achieved by this loop circuit antenna 12, and the top cover 20 described later is applied as the antenna (auxiliary antenna), in which reading and writing (data call, registration, deletion, update, or the like) by radio communication are performed from or to the reader/writer (not shown), and data recorded in the IC chip 11 are configured to be identified.

Here, as the data to be recorded in the IC chip 11, for example, optional data such as an identification code, a name, weight, a net content, producer and seller names, a production place, production date, an expiration date of goods and the like is recordable, and is also rewritable.

The loop circuit antenna 12 is formed by forming a pattern into a prescribed shape and size (length, area) on a surface of one seal film 13 serving as the substrate, for example, by conductive ink or etching a metal thin film such as an aluminum evaporation film having conductivity and the like, or the like.

It is preferable that the seal film 13 is formed of a film material having flexibility, such as polyethylene, polyethylene terephthalate (PET), polypropylene, polyimide, polyvinyl chloride (PVC), an acrylonitrile-butadiene-styrene copolymerization synthetic resin (ABS) and the like, for example, and that the IC chip 11 and the loop circuit antenna 12 to be sealed are configured of a transparent PET resin or the like visible from outside. Moreover, a film surface on one surface side of the seal film 13 can be provided with a pressure sensitive adhesive layer and an adhesive layer so as to be applied to the substrate or the item.

As a communication frequency band to be used in the inlay 10, in the RF tag 1 of the present embodiment, for example, 860 M to 960 MHz bands belonging to a so-called UHF band can be applied as a target.

Specific examples of the frequency band generally used in the RF tag include several kinds of frequency bands such as a bandwidth of 135 kHz or less, a 13.56 MHz band, 860 M to 960 MHz bands belonging to a UHF band, a 2.45 GHz band, and the like. Then, a communication distance capable of radio communication is different depending on the frequency band used, and an optimum antenna length or the like or wiring pattern differs depending on the frequency band.

In the present embodiment, the inlay 10 does not have the dipole antenna, whereby size reduction can be achieved. Moreover, the top cover 20 to be disposed on the surface of the casing 50 functions as the auxiliary antenna. Thus, the UHF band in which a wavelength is short and size reduction of the antenna can be achieved can be applied as the target. For example, an 860 MHz band or a 920 MHz band can be applied as the target, and favorable communication characteristics can be obtained in these frequency bands.

However, if the constraints of a size of the inlay 10 or the casing 50, and the like are not imposed, a technological idea per se according to the present invention is not limited to a specific frequency band. For example, an optional frequency band other than the UHF band can also be obviously applied.

[Casing]

The casing 50 is the protective means for protecting the inlay 10 by accommodating the inlay 10 not having the above-described dipole antenna therein.

The inlay 10 is protected by this casing 50. Thus, weather resistance, heat resistance, waterproofness and the like as the RF tag are enhanced.

Specifically, as shown in FIGS. 1 to 4, the casing 50 is wholly formed into a rectangular parallelepiped shape, having: a top surface side casing 51 having a concave portion 51a (see FIG. 3, FIG. 4(b) and FIG. 4(c)) serving as a space in which the inlay 10 is immovably accommodated and disposed; and a bottom surface side casing 52 for covering a bottom surface opening part of the top surface side casing 51 to close and keep the part aright.

Moreover, in the top surface side casing 51, a concave portion 51b (see FIG. 2, FIGS. 4(b) and 4(c)) serving as a space in which the top cover 20 is immovably disposed and fixed is formed on a surface serving as a top surface of the RF tag 1, and the top cover 20 serving as the antenna of the inlay 10 is bonded and fixed in a state in which the top cover 20 is disposed, in a prescribed position, with the inlay 10 in the casing 50.

The concave portion 51a is formed into a concave shape which is one size larger than the inlay 10 and has a depth substantially equivalent to or somewhat larger than a thickness of the inlay 10, in a prescribed position on an inner surface of the top surface side casing 51 according to an external shape of the inlay 10 so that the inlay 10 can be accommodated and disposed therein.

The concave portion 51b is formed into a concave shape which is one size larger than the top cover 20 and has a depth substantially equivalent to or somewhat larger than a thickness of the top cover 20, in a prescribed position on a surface of the top surface side casing 51 according to an external shape of the top cover 20 so that the top cover 20 can be disposed and laminated thereon.

In the inlay 10 and the top cover 20 which are positioned and disposed in the concave portions 51a and 51b by having such concave portions 51a and 51b, a cutout 21 of the top cover 20 on the surface of the casing 50 and the inlay 10 in the casing 50 are positioned, and the inlay 10 is disposed in the casing 50 so as to be positioned inside the cutout 21. Moreover, in the concave portion 51b, projections are provided one by one on a side of both ends facing each other on a diagonal line, and an asymmetrical L-shaped top cover 20 is disposed in a right direction (see FIG. 2).

The top cover 20 and the IC chip 11 of the inlay 10 are disposed with facing each other through the casing 50 (top surface side casing 51) by positioning and a disposition configuration according to such concave portions 51a and 51b, electric connection is performed by so-called capacitor coupling, and the top cover 20 functions as the antenna (auxiliary antenna) of the inlay 10.

The inlay 10 and the top cover 20 can be positioned in a prescribed position of the top surface side casing 51 to be easily and reliably disposed by having such concave portions 51a and 51b, and such concave portions can be functioned as a relief space in which the inlay 10 can be avoided from direct application of the external forces even if the external forces, shocks or the like are applied to the casing 50 from outside.

As the concave portion 51a which functions as such a relief space, in addition to the concave portion according to the external shape of the inlay 10, for example, a concave portion in which the IC chip 11 of the inlay 10 is disposed can also be provided. In the inlay 10, the IC chip 11 forms a part which most easily causes damage or the like, and therefore the concave portion in which the IC chip 11 is disposed and housed can be provided. As such a concave portion for the IC chip, a further dented concave portion can be provided in a position in which the IC chip 11 in the above-described concave portion 51a is disposed. Moreover, only the concave portion in which only the IC chip 11 is disposed and housed can also be provided by omitting the concave portion for the inlay.

The bottom surface side casing 52 is formed into a plate-shaped cover member to be fitted into an opening part on the bottom surface side of the top surface side casing 51 to wholly close the opening of the top surface side casing 51.

In the present embodiment, the bottom surface side casing 52 is wholly inserted and fitted into the bottom surface opening part of the top surface side casing 51. Thus, the bottom surface side casing 52 is formed to be substantially the same plane (so-called flush) as a back surface of the top surface side casing 51 (see FIGS. 1(a), 1(b) and FIG. 4(c)) in a state in which the opening part is closed.

The bottom surface side casing 52 fitted and closed in the opening of the top surface side casing 51 is bonded with the top surface side casing 51, for example, by ultrasonic fusion, thermal fusion, an adhesive or the like, and the casing 50 is kept airtight from outside and sealed.

Then, in a state in which the top surface side casing 51 is kept airtight by the bottom surface side casing 52, the casing 50 is used by being mounted to the item and the object in which the RF tag 1 is used, for example, by the adhesive, screwing or the like, or by being installed and fitted into a prescribed place of the item and the object.

In the present embodiment, as shown in FIGS. 1(a) to 4(d), in the casing 50, mounting holes 50a, 50b which integrally penetrate through the top surface side casing 51 and the bottom surface side casing 52 (and the top cover 20) fitted therein are pierced on a side of both longitudinal ends of the casing 50.

Screws (see a screw 101 shown in FIG. 4(d)) serving as a fixing means for fixing the RF tag 1 to the object, or the like are inserted into the mounting holes 50a, 50b. Thus, the casing 50 can be installed and fixed in a prescribed place of the item and the object in which the RF tag 1 is used.

The screw 101 and the top cover 20 can be formed into an insulated state by a resin constituting the mounting holes 50a, 50b by providing such mounting holes 50a, 50b, also when the casing 50 is mounted to a metal mounting target.

Accordingly, even if a metal screw 101 used, the mounting holes 50a, 50b function as an insulation means. Thus, the top cover 20 and the metal mounting target can be insulated from each other.

Here, specific examples of a material which forms the casing 50 include: a thermoplastic resin such as a polycarbonate resin, an acrylonitrile-ethylene-styrene copolymer (AES) resin, a polypropylene resin, a polyethylene resin, a polystyrene resin, an acrylic resin, a polyester resin, a polyphenylene sulfide resin, an acrylonitrile-butadiene-styrene copolymer (ABS) resin, a polyvinyl chloride resin, a polyurethane resin, a fluorocarbon resin, a silicone resin and the like; and a resin material such as a thermoplastic elastomer and the like. In addition thereto, a fiber reinforced resin which is excellent in heat resistance or weather resistance, such as a glass fiber resin, a carbon fiber resin and the like can also be utilized. These fiber reinforced resins have a higher relative dielectric constant than the resin described above, and therefore are effective in achieving size reduction of the casing by a wavelength shortening effect described later.

In the present embodiment, the casing 50 can be formed particularly with a weather-resistant AES resin, a weather-resistant polycarbonate resin or the like because such a resin is excellent in weather resistance, heat resistance, water resistance or the like, and is easy to be formed, processed and the like according to the external shape of the inlay 10 or the top cover 20, or the like.

Moreover, the top surface side casing 51 and the bottom surface side casing 52 which constitutes the casing 50 formed of the resin material as described above are preferably formed of the same resin material.

As described above, the top surface side casing 51 and the bottom surface side casing 52 are configured to be bonded by a means such as the ultrasonic fusion and the like after the opening part of the top surface side casing 51 is closed by the bottom surface side casing 52.

Therefore, the top surface side casing 51 and the bottom surface side casing 52 are formed of the same resin material. Thus, when both are bonded by fusion or adhesion, both can be further reliably and firmly bonded.

However, as long as the top surface side casing 51 and the bottom surface side casing 52 can be bonded and sealed, both can also be formed of a material different from each other.

Moreover, with regard to an external shape of the casing 50, as long as the inlay 10 can be accommodated therein and the top cover 20 can be disposed on its surface, a shape, a structure and the like of the external shape can be changed. For example, the external shape of the casing 50 can be appropriately designed and changed according to the structure or the size of the item in which the RF tag 1 is used, a use state of the tag, or the like.

[Protective Member]

A protective member can be further provided for the inlay 10 which is disposed and accommodated in the concave portion 51a of the top surface side casing 51 as described above.

The protective member can be configured of a plate-shaped member or a sheet-shaped member, for example, a heat-resistant sheet which is about one size larger than the inlay 10 to cover a top surface and/or a bottom surface of the inlay 10 to be accommodated in the casing 50, or the like, for example.

It should be noted that such a protective member only needs to protect at least any one surface of the top surface or the bottom surface of the inlay 10.

The inlay 10 is formed in a state in which the top surface or the bottom surface is covered with the heat-resistant sheet or the like by providing such a protective member, and therefore upon being accommodated inside the casing 50, the inlay 10 can be protected from heat, pressure or the like to be applied, for example, when the top surface side casing 51 and the bottom surface side casing 52 are bonded, or when the inlay 10 is integrally accommodated and sealed with the casing 50 by in-mold molding or the like.

Moreover, the protective member can also improve cushioning performance, waterproofness, heat resistance or the like for the inlay 10, and can be functioned as a cushioning material, a water-proof material and a heat-resistant material also against the external forces applied to the completed casing 50 to achieve further thorough protection of the inlay 10.

[Top Cover]

The top cover 20 is a planar member which covers one surface side of the casing 50, and is formed of a prescribed metallic material.

One surface (top surface) side of the casing 50 is protected by a metallic plate by having such a metal top cover 20. Thus, durability, shock resistance, weather resistance, heat resistance, waterproofness or the like as the RF tag is enhanced, and the top cover 20 can be functioned as the antenna of the inlay 10 not having the dipole antenna which is accommodated inside the casing 50.

Specifically, as shown in FIGS. 1(a) to 3, the top cover 20 is formed of the plate-shaped member composed of the metallic material, and is wholly configured of an L-shaped metallic plate in plan view, having the cutout 21 opening at least on one side of the plate-shaped member, or in the present embodiment, on a side of adjacent two sides.

Then, the top cover 20 is disposed and fixed on the surface of the casing 50. Thus, the cutout 21 of the top cover 20 and the inlay 10 accommodated in the casing 50 are positioned, and in the casing 50, the inlay 10 is disposed so as to be positioned inside the cutout 21. According to such a disposition configuration, the top cover 20 and the IC chip 11 of the inlay 10 are configured to be disposed with facing each other through the casing 50 (top surface side casing 51), and electrically connected to each other by so-called capacitor coupling, and the top cover 20 is configured to function as the antenna (auxiliary antenna) of the inlay 10.

Details of a function of the top cover 20 as the auxiliary antenna will be described later.

Thus, the top cover 20 covering the surface of the casing 50 is made of metal, whereby even against mechanical and physical external forces, shocks or the like applied to the RF tag 1, an inside of the casing can be protected by strength, durability and shock resistance of the metal top cover 20, and the inlay 10 accommodated in the casing 50 can be effectively prevented from causing damage or failure.

Then, the top cover 20 can be functioned as the antenna of the inlay 10 of the casing 50 by having the metal top cover 20, and even if the inlay 10 does not have the dipole antenna, radio communication of the RF tag 1 can be performed.

Here, as the metallic material constituting the top cover 20, for example, steel, copper, stainless steel, aluminum alloy, zinc alloy or the like can be used.

It should be noted that the reason why the casing 50 is made of metal is that durability, shock resistance or the like against the mechanical and physical external forces applied to the surface of the RF tag 1 is obtained, and the auxiliary antenna of the inlay 10 is configured of the metallic member to be disposed on the surface of the RF tag 1.

Accordingly, in order to achieve such a purpose, the top cover 20 to be disposed on a side of the top surface (surface of the top surface side casing 51) of the casing 50 only needs to be made of at least metal, and on a side of the back surface (surface of the bottom surface side casing 52) of the casing 50, it is sufficient to be made of nonmetal, for example, a synthetic resin. However, the metal plate member or the like can also be disposed also on the side of the back surface of the casing 50.

Moreover, as shown in FIG. 2 and FIG. 3, in both longitudinal end portions of the top cover 20 to be stacked on the casing 50, mounting holes 20a, 20b are pierced at positions corresponding to the mounting holes 50a, 50b formed in the casing 50.

Moreover, engaging holes to be engaged with projections of the concave portion 51b of the top surface side casing 51 are provided one by one on a side of both ends facing each other on the diagonal line of the top cover 20, and the projections and engaging holes are engaged with each other. Thus, the asymmetrical L-shaped top cover 20 is disposed in the right direction (see FIGS. 1(a) to 3).

The mounting holes 20a, 20b are formed as one size lamer through-holes so that outer edges of the mounting holes 50a, 50b of the casing 50 can be inserted into and engaged therewith, and the screws 101 (see FIG. 4(d)) serving as the fixing means for fixing the RF tag 1 to the object are inserted into the mounting holes 50a, 50b. Thus, the screws 101 and the top cover 20 (mounting holes 20a, 20b) are insulated by the resin constituting the mounting holes 50a, 50b.

Thus, even if the metal screws 101 are used, the mounting holes 50a, 50b of the casing 50 function as an insulation means, and the top cover 20 and a metal mounting target are configured to be insulated.

[Antenna Function of Top Cover]

Then, in the present embodiment, the top cover 20 constituting the casing 50 as described above is configured to function as the antenna (auxiliary antenna) of the inlay 10 to be accommodated in the casing 50.

The auxiliary antenna functions as the antenna for improving and adjusting the communication characteristics of the above-described inlay 10, and is ordinarily configured of a planar conductive member to be disposed and laminated on one surface side (top surface side) of the inlay 10, and is disposed in the insulated state from the inlay 10 resin-sealed with the seal film 13.

More specifically, the auxiliary antenna formed of the conductive members such as metal and the like is physically in the insulated state from the inlay 10 because the inlay 10 is wholly resin-sealed with the seal film 13. Then, such an auxiliary antenna is disposed on one surface side of the inlay 10. Thus, the auxiliary antenna and the IC chip 11 of the inlay 10 are configured to be disposed with facing each other through the seal film 13, and electrically connected to each other by so-called capacitor coupling.

Thus, the auxiliary antenna is laminated on the inlay 10 in a longitudinal direction (height direction), whereby a two-dimensional antenna is configured by the loop circuit antenna 12 and the auxiliary antenna of the inlay 10, and the auxiliary antenna is configured to function as a booster of a communication radio wave, and the communication characteristics of the inlay 10 are adjusted and improved.

Then, in the present embodiment, such an auxiliary antenna is configured of the top cover 20 which is the conductive member to be disposed and laminated on the top surface side of the casing 50 in which the inlay 10 is accommodated.

The top cover 20 of the present embodiment is made of metal as described above, and therefore serves as the conductive member to be disposed on the top surface side of the inlay 10 accommodated in the casing 50. Moreover, the inlay 10 is resin-sealed with the seal film 13, and further the casing 50 (top surface side casing 51) made of the synthetic resin is disposed on the top surface side of the inlay 10, and the top cover 20 and the inlay 10 are formed in the insulated state from each other, and are electrically connected to each other by so-called capacitor coupling.

Accordingly, the top cover 20 is formed in a prescribed shape. Thus, the metal top cover 20 per se can be functioned as the antenna of the inlay 10 to be accommodated in the casing 50, namely, as the auxiliary antenna.

FIG. 4(a) shows a plan view of the top cover 20 of the casing 50, which functions as the auxiliary antenna of the inlay 10.

As shown in FIG. 4(a), in the present embodiment, the auxiliary antenna configured of the top cover 20 has the cutout 21 opening on the side of adjacent two sides of the top cover 20, the inlay 10 (the IC chip 11 and the loop circuit antenna 12) not having the dipole antenna is disposed so as to be positioned inside the cutout 21, in which each one side or two sides of the cutout 21 and the inlay 10 are configured to be disposed in parallel to each other.

The top cover 20 and the inlay 10 are not overlapped with each other in the plan view in the completed state of the RF tag 1 by having such a cutout 21, and each side of the cutout 21 and the inlay 10 are disposed so as to face each other in parallel to each other.

Specifically, the cutout 21 is formed into an L-shaped rectangular and planar shape in plan view, in which a short side has a length (depth) substantially the same as a short side of the inlay 10, and a long side has a length larger than a long side of the inlay 10.

Thus, the cutout 21 is to be formed into a concave shape which is opened in any rim of the top cover 20 constituting the auxiliary antenna, and has a prescribed width and a prescribed depth in which the inlay 10 not having the dipole antenna can be disposed therein.

It should be noted that the cutout 21 only needs to be opened at least on one side of a metallic plate constituting the top cover 20, and can be formed into a cutout 21 in a U shape in plan view, opening only in one long side of the top cover 20, for example, in addition to the above-described L-shaped cutout 21 in plan view, opening on the side of adjacent two sides.

Also in this case, the inlay 10 disposed so as to be fitted inside the cutout 21 is to be disposed to be in parallel to each one side or two sides of the cutout 21.

Then, a length of the top cover 20 constituting the auxiliary antenna specifies a size of the whole of the RF tag 1, and based on a wavelength of a radio frequency of the inlay 10, the top cover 20 is formed into a length corresponding to a ½ wavelength of the radio frequency of the inlay 10, for example.

When an ordinary inlay having the dipole antenna is used, the dipole antenna per se of the inlay has the length corresponding to the ½ wavelength, and therefore if the inlay is attempted to be accommodated in the casing, the casing is required to have a length exceeding the ½ wavelength, in which a dimension becomes excessively long (excessively large), and such a case is not preferred in properties of the RF tag in which size reduction is requested.

Consequently, in the present embodiment the inlay 10 not having the dipole antenna is used. Thus, a length of a long side of the auxiliary antenna configured of the top cover 20 to be substantially the same as the length of the casing 50 can be adjusted to a length of approximately ½ of the wavelength of the radio frequency of the inlay 10, and an overall length of the RF tag 1 can be adjusted to a length of an approximately ½ wavelength.

Here, the term "approximately ½" obviously includes a case where the wavelength is exactly "½(0.5)" relative to the wavelength of the radio frequency, or may be about "½," and for example, the wavelength even in the range of ±20% of the ½ wavelength (0.4 to 0.6), or the like falls under "approximately ½" according to the present invention.

Moreover, in the present embodiment, the inlay 10 not having the dipole antenna is used, and therefore a length of a long side of the top cover 20 serving as the auxiliary antenna can also be shortened than the length of approximately ½ of the wavelength of the radio frequency of the inlay 10 as described above.

For example, the length of the long side of the top cover 20 serving as the auxiliary antenna can be adjusted to a length of approximately ¼ of the wavelength of the radio frequency of the inlay 10. Thus, size reduction of the RF tag 1 including the top cover 20 and the casing 50 can be wholly further achieved.

It should be noted that the term "approximately ¼" herein obviously includes a case where the wavelength is exactly "¼(0.25)" relative to the wavelength of the radio frequency, in the same manner as in the above-described "approximately ½," or may be about "¼," and for example, the wavelength even in the range of ±20% of a ¼ wavelength (0.2 to 0.3), or the like falls under "approximately ¼" according to the present invention.

Moreover, when a planar auxiliary antenna is laminated on an ordinary inlay, if the auxiliary antenna is positioned by being overlapped with the IC chip, the loop circuit antenna or the dipole antenna of the inlay, the communication characteristics of the IC chip are adversely affected by the conductive member which forms the auxiliary antenna.

More specifically, a loop circuit is formed in the vicinity of the IC chip of the inlay (loop circuit antenna), this loop circuit antenna has a purpose of matching impedance, and is provided in order to perform communication in a magnetic field component, and this magnetic field component is required not to be hindered by the conductor constituting the auxiliary antenna.

Moreover, the ordinary inlay has the dipole antenna, and the auxiliary antenna is positioned by being overlapped with this dipole antenna. Thus, impedance matching according to the loop circuit antenna is hindered, and the communication characteristics of the IC chip are adversely affected in several cases.

Consequently, in the present embodiment, the inlay 10 not having the dipole antenna is used, and in stacking and laminating the top cover 20 constituting the auxiliary antenna on the inlay 10, the cutout 21 is formed on the top cover 20 so as to avoid presence of the conductive member constituting the auxiliary antenna in a part in which the IC chip 11 and the loop circuit antenna 12 are positioned.

Moreover, a size (width and depth) of the cutout 21 to be provided in the top cover 20 only needs to have at least a size in which the top cover 20 (auxiliary antenna) is not present in being stacked on the inlay 10, and the width and the depth of this cutout 21 are appropriately adjusted. Thus, impedance matching can be achieved according to the radio frequency of the IC chip 11, material of the above-described casing 50, influence from the item to which the RF tag 1 is mounted, or the like.

Accordingly, the cutout 21 only needs to have at least a size in which the inlay 10 can be disposed, and the width and the depth which can be appropriately adjusted and changed within the range of the size of the top cover 20 (auxiliary antenna).

More specifically, for example, when a communication frequency of the inlay 10 is 920 MHz, relations: $\lambda \approx 326.0$ mm, $\lambda/2 \approx 163.0$ mm and $\lambda/4 \approx 81.5$ mm hold. Accordingly, the auxiliary antenna configured of the top cover 20 is formed so that the length of the long side may become around 163.0 mm or around 81.5 mm, and the cutout 21 is formed within the range ($\lambda$ represents a wavelength. The same shall apply hereinafter).

It should be noted that a resin layer constituting the casing 50 for accommodating the inlay 10 therein produces a wavelength shortening effect, and an apparent wavelength is shortened in several cases. Relative dielectric constant ($\varepsilon$) of the resin layer is about "2 to 4," and a shortened wavelength in this case is determined by a ratio: $\lambda/\sqrt{\varepsilon}$, for example.

Accordingly, the length of the long side of the auxiliary antenna configured of the top cover 20 in the present embodiment is also an approximate value, and if the value is approximately $\lambda/2$ or approximately $\lambda/4$, such a case is sufficient, and the length gives or takes depending on a change in the communication characteristics due to the material of the casing 50 of the RF tag 1, a use environment of the tag, a use aspect or the like.

Moreover, the cutout 21 formed in the top cover 20 constituting the auxiliary antenna is configured to be set based on a dimension of the inlay 10 to be used, and is formed in such a length and a depth that a conductive member of the top cover 20 (auxiliary antenna) is not overlapped with the inlay 10 not having the dipole antenna.

Specifically, the width (length in a longitudinal direction) and the depth (length in a transverse direction) of the cutout 21 are formed in a size, based on the width (length in the longitudinal direction) and the depth (length in the transverse direction) of the inlay 10, in which the top cover 20 is not overlapped with the loop circuit antenna 12 and the inlay 10 is fitted inside the cutout 21.

For example, when the size of the width of the inlay 10 (loop circuit antenna 12) is about 15 to 18 mm and the height of the inlay 10 is about 10 to 12 mm, the cutout 21 can be formed in the range of about 16 to 19 mm or more in the width and 11 to 13 mm or more in the depth.

[Laminate Structure of Casing]

Next, a laminate structure of the casing 50, the inlay 10 and the top cover 20 of the RF tag 1, which is formed of the configuration as described above, according to the present embodiment will be described with reference to FIGS. 4(*b*) to 4(*d*).

FIGS. 4(*b*) to 4(*d*) are each a cross-sectional front view showing the RF tag 1 according to one embodiment of the present invention to show a case where the RF tag 1 is mounted on an object 100 serving as a mounting object and is fixed with screws 101, and the laminate structure of an inlay 10 in a casing 50 and a top cover 20 on a surface of the casing 50.

First, as shown in FIG. 4(*b*), the inlay 10 is disposed by being positioned with a concave portion 51*a* on an inner surface of a top surface side casing 51, and a bottom surface side casing 52 is disposed by being positioned with a bottom surface opening of the top surface side casing 51. Moreover, the top cover 20 is disposed by being positioned with a concave portion 51*b* on a surface of the top surface side casing 51.

At this time, the protective member (not shown) such as the heat-resistant sheet as described above and the like is disposed on a top surface and/or a bottom surface of the inlay 10. Thus, the inlay 10 can be protected.

In this state, as shown in FIG. 4(*c*), the top surface side casing 51 and the bottom surface side casing 52 are fitted and bonded, and an inner space of the casing 50 is kept airtight from outside and sealed.

Moreover, the top surface side casing 51 and the top cover 20 are bonded, and the inlay 10 in the casing 50 is disposed within the range of a cutout 21 of the top cover 20.

Thus, assembly of the RF tag 1 is completed.

From this state, as shown in FIG. 4(*d*), the RF tag 1 is mounted on an optional mounting object 100.

With regard to fixing of the RF tag 1, the screws 101 serving as the fixing means are inserted into and passed through the mounting holes 50*a*, 50*b* of the casing 50 and the mounting holes 20*a*, 20*b* of the top cover 20 to screw the screws 101 into the mounting object 100. Thus, the RF tag 1 can be installed and fixed to a prescribed place of the mounting object 100. At this time, the screws 101 are insulated from the top cover 20 by the mounting holes 50*a*, 50*b*. Thus, the top cover 20 and the mounting object 100 are formed into the insulated state. Accordingly, even if the mounting object 100 and the screw 101 are made of metal, the top cover 20 and the mounting object 100 is formed into the insulated state. Thus, an antenna function of the top cover 20 is not influenced by the metal mounting object 100.

[Production Method]

Next, a production method of the RF tang 1 formed of the laminate structure as described above will be described.

The RF tag 1 according to the present embodiment can be molded and produced according to the process as described below, for example.

[Injection Molding+Ultrasonic Welding]

(1) First, a resin to be formed into the top surface side casing 51 of the casing 50 is injected and bonded with a metallic plate constituting the top cover 20.

At this time, the top cover 20 is an asymmetrically-shaped metallic plate having the cutout 21, and therefore it is preferable to provide the resin with a hole and a projection engaging therewith so that the metallic plate may be disposed in the right direction to prevent other parts from being inversed.

(2) Then, the inlay 10 is applied onto an inner surface side of the resin constituting the top surface side casing 51 bonded with the metallic plate.

(3) A resin constituting the bottom surface side casing 52 is bonded, by ultrasonic welding or the like, to a bottom surface side opening of the top surface side casing 51 on which the metallic plate serving as the top cover 20 is mounted.

[Two-Time Injection Molding]

(1) First, the resin to be formed into the top surface side casing 51 of the casing 50 is injected and bonded with the metallic plate constituting the top cover 20.

(2) Then, the inlay 10 provided with heat resistance, for example, by a heat-resistant sheet or the like is applied to the resin constituting the top surface side casing 51 in a mold.

(2) Second injection is performed to mold the bottom surface side casing 52 covering the bottom surface opening of the top surface side casing 51 to which the inlay 10 is applied, thereby fixing and bonding both.

[One-Time Injection Molding]

(1) The inlay 10 is previously applied to the metallic plate constituting the top cover 20.

(2) Then, a resin constituting the casing 50 (the top surface side casing 51 and the bottom surface side casing 52) is injected.

It should be noted that each production method as described above is one example, and the present invention is not particularly limited to the above-described method and process only.

More specifically, the production method or the production process is not particularly limited, as long as the RF tag 1 according to the present embodiment can be configured.

[Bonding Method of Top Cover]

Next, details of a bonding method between the metal top cover 20 and the resin casing 50 (top surface side casing 51) in the production method as described above will be described with reference to FIGS. 5(*a*) to 5(*c*).

As shown in FIG. 5(*a*), for example, a metal top cover 20 and a resin casing 50 can be bonded with each other by roughening a surface of a metallic plate constituting the top cover 20 by using a method such as chemical conversion, laser irradiation treatment, and the like.

Specifically, (1) on the surface of the metallic plate constituting the top cover 20, (2) a fine uneven shape is formed to roughen the surface by chemical etching, (3) a melted resin is laminated on the roughened surface of the metallic plate to enter the resin into the uneven shape. Then, (4) the metallic plate and the resin are fixed by solidification of the melted resin. Thus, the top cover 20 and the casing 50 are firmly bonded with each other.

Moreover, with regard to bonding between the metal top cover 20 and the resin casing 50, as shown in FIG. 5(*b*), a surrounding of an outer edge of the metallic plate constituting the top cover 20 is covered with the resin constituting the casing 50. Thus, both can be further firmly bonded and fixed to each other.

For example, the concave portion 51*b* (see FIG. 2 and FIGS. 4(*b*) and 4(*c*)) serving as a space in which the top cover 20 is immovably disposed is formed on the surface of the casing 50 (top surface side casing 51). Thus, the top cover 20 can be disposed and bonded at a prescribed position by the concave portion 51*b*.

Further, as shown in FIG. 5(*c*), a plurality of through-holes are provided on the surface of the metallic plate constituting the top cover 20 to enter the melted resin constituting the casing 50 into the plurality of through-holes and solidify the resin. Thus, the top cover 20 and the resin casing 50 can be firmly bonded with each other.

It should be noted that, in addition to the bonding method shown in FIGS. 5(*a*) to 5(*c*), for example, a bonding surface between the casing 50 and the top cover 20 can be adhered and bonded to each other by using a bonding member such as a thermal welding sheet, an (elastic) adhesive and the like.

These bending methods in FIGS. 5(*a*) to 5(*c*) and bonding by the bonding member such as the adhesive and the like can be optionally combined and used.

[Insulated Structure of Top Cover]

Next, in the RF tag 1 according to the present embodiment, a structure in which the top cover 20 and the mounting object 100 are fixed while insulating both will be described with reference to FIGS. 6(a) and 6(b).

With respect to insulation between the top cover 20 and the mounting object 100, as shown in FIG. 6(a) (and FIG. 4(d)), the fixing means such as the screw (see the screw 101 shown in FIG. 4(d)) and the like is screwed into and fixed to the mounting object 100 through the mounting holes 50a, 50b provided in the casing 50 and the mounting holes 20a, 20b provided in the top cover 20. Thus, the screws are insulated from the top cover 20 by the resin mounting holes 50a, 50b.

At this time, surroundings of the metallic holes (mounting holes 20a, 20b) formed in the top cover 20 are covered with the resin constituting the casing 50, and a bolt head of the screw 101 serving as a mounting means is lowered than the mounting holes 50a, 50b of the casing 50 (see FIG. 4(d)). Thus, the screw 101 is reliably insulated from the top cover 20.

Moreover, the bolt head of the screw 101 is lowered than a thickness of the RF tag 1 by forming such a configuration, resulting in an advantage of eliminating catching or the like.

Moreover, as shown in FIG. 6(b), the mounting holes 50a, 50b of the fixing means of the screw 101 are provided only in the casing 50 and not provided in the top cover 20 to prevent the screw 101 from contacting with the top cover 20. Thus, the top cover 20 can also be insulated from the mounting object 100.

As described above, in the RF tag 1 of the present embodiment, the length of the top cover 20 can be formed into a length of the ½ wavelength or the ¼ wavelength by using the inlay 10 not having the dipole antenna. Therefore, the length of the resin casing 50 is molded in a level larger (longer) than the length of the top cover 20. Thus, the mounting holes 50a, 50b for the screws 101 can be provided only in the casing 50.

The top cover 20 and the mounting object 100 can be formed into the insulated state by adopting the structures shown in FIGS. 6(a) and 6(b) as described above, and even if the RF tag 1 is fixed using the metal screw or the like, it can be avoided that the antenna function of the top cover 20 is influenced by the metal constituting the mounting object 100.

It should be noted that insulation between the top cover 20 and the mounting object 100 is not limited to the above-described method and structure only. The top cover 20 and the mounting object 100 can also be formed into the insulated state, for example, by using a non-metal screw or the like as the fixing means for fixing the RF tag 1, or fixing the casing 50 (bottom surface side casing 52) to the mounting object 100 by using the adhesive or the like without using the fixing means such as the screw and the like.

[Configuration Pattern of Casing]

Figure 7:
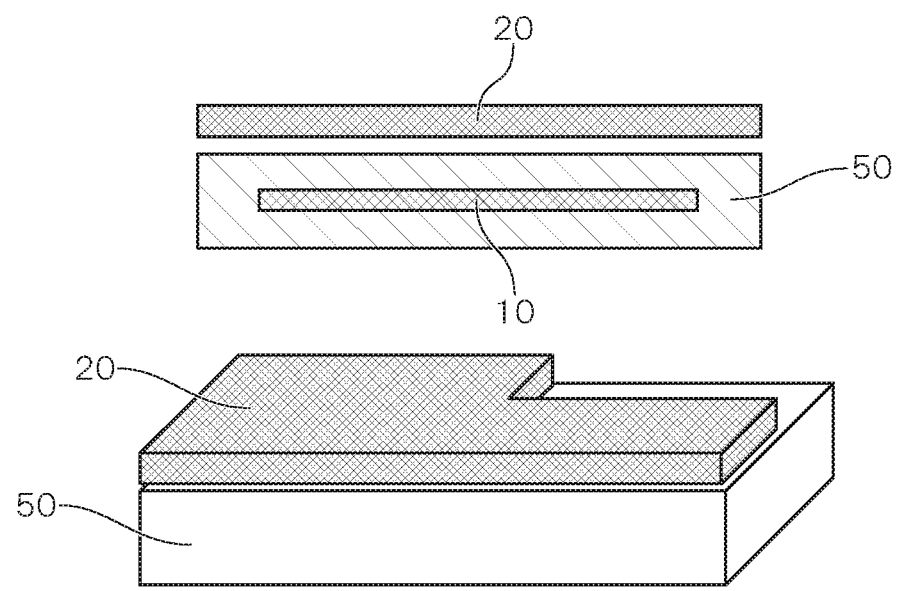
Figure 7:
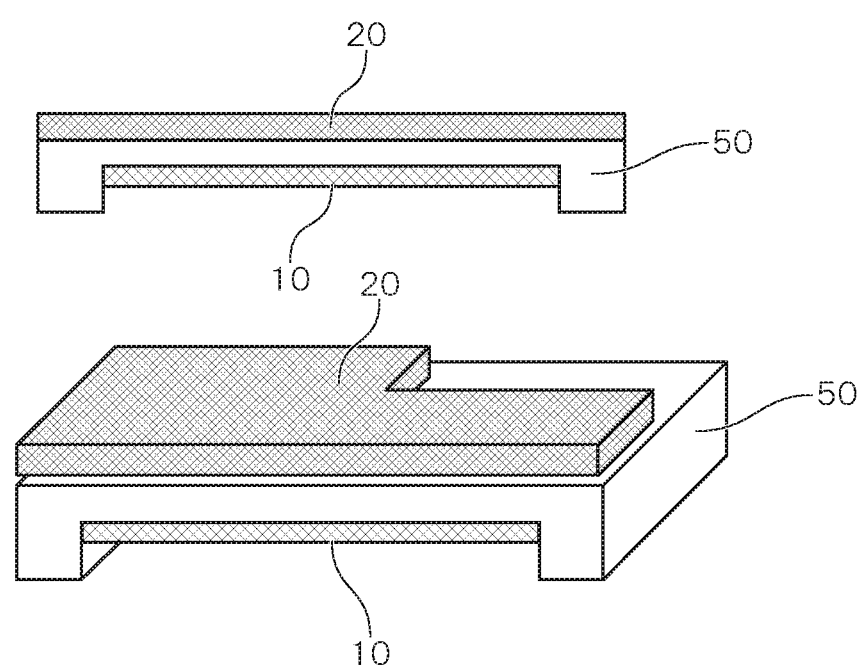

Next, a configuration pattern of a casing 50 of an RF tag 1 according to the present embodiment will be described with reference to FIGS. 7(a) and 7(b).

As shown in FIG. 7(a), a casing 50 of an RF tag 1 can be first formed into a configuration in which an inlay 10 is completely accommodated and sealed inside the casing 50.

In this case, the RF tag 1 can be used by combining parts, and is not used as an integrated product. More specifically, on a tag of a resin casing 50 in which the inlay 10 is accommodated, a metallic plate (auxiliary antenna) constituting a top cover 20 is stacked and fixed from above, and a resulting material can be used.

According to such a configuration, the top cover 20 produces an effect as the auxiliary antenna relative to the tag, and further functions as a fixing device for fixing the tag.

Moreover, as shown in FIG. 7(b), the casing 50 can also be formed into a configuration in which the inlay is applied and disposed on an inner surface side of the casing 50 opening on a bottom surface side.

In this case, the casing 50 is formed into a state in which the casing 50 is configured of a frame only, in which the inlay 10 applied on the inner surface side is opened on the bottom surface side of the casing.

Also in this case, the inlay 10 is protected by the casing 50 and the metal top cover 20 on a surface (top surface) side of the casing 50, and is effectively protected from the external forces or the like.

Moreover, the casing 50 opening on the bottom surface side has advantages of achieving weight reduction, material reduction and the like, and also being able to easily perform detachment and exchange of the inlay 10.

[Communication Characteristics]

Next, the communication characteristics of the RF tag 1 formed of the configuration as described above according to the present embodiment will be described with reference to FIG. 8.

Figure 8:
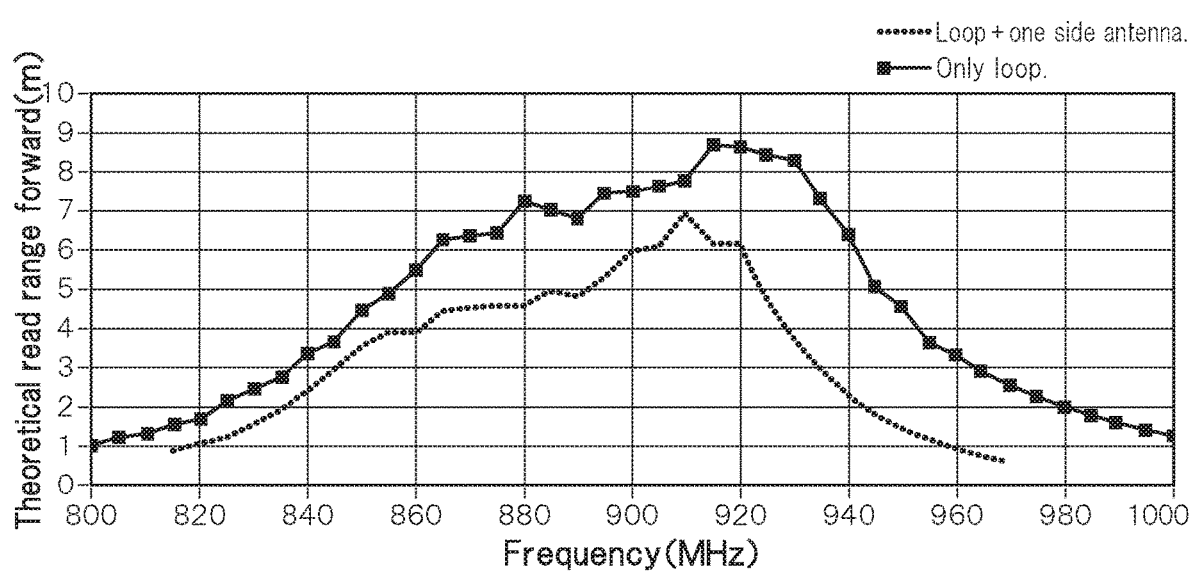
FIG. 8 is a line graph showing communication characteristics of the RF tag according to the first embodiment of the present invention to show a relationship between a communication distance and a frequency.

FIG. 8 is a line graph showing the communication characteristics of the RF tag according to one embodiment of the present invention to show a relationship between a communication distance and a frequency.

In FIG. 8, a graph shown by a -■- line indicates a case of an RF tag 1 using an inlay 10 not having a dipole antenna according to the present embodiment, and a graph shown by a dashed line indicates a case of using an inlay in which one side of the dipole antenna is removed, and one side is left for an RF tag in the same configuration as in the RF tag 1.

As shown in the graph in FIG. 8, it is known that, in the case of the RF tag 1 according to the present embodiment, a longer communication distance is obtained in 800 to 1000 MHz bands, as compared with the RF tag having the dipole antenna.

In particular, a communication distance of 6 m or more is obtained in 860 to 940 MHz bands, and a peak (about 8 to 9 m) of the communication distance is obtained in a 920 MHz band.

In contrast thereto, in the RF tag using the inlay 10 having the dipole antenna, a peak (about 7 m) of the communication distance is obtained in 900 to 920 MHz bands, but the communication distance is about 5 m or less in other bands, and in bands of 830 MHz or less and 960 MHz or more, communication performance is significantly reduced, and radio communication becomes difficult or impossible.

Thus, in the RF tag 1 according to the present embodiment, it is known that the communication characteristics of the RF tag 1 can be favorably maintained and improved, as compared with the case where the inlay having the dipole antenna is used.

Second Embodiment

The RF tag 1 according to the first embodiment described above has a configuration in which, as the conductor which functions as the antenna (auxiliary antenna) of the inlay 10, the top cover 20 formed of the metallic plate is disposed and laminated on the surface (top surface) of the casing 50. However, the conductor which functions as the antenna of the inlay 10 can also be configured so that the conductor may be accommodated inside the casing 50.

Hereinafter, the second embodiment of the RF tag 1 in which such a configuration is adopted will be described with reference to FIG. 9, FIGS. 10(a), 10(b), 10(c) and 10(d).

Figure 9:
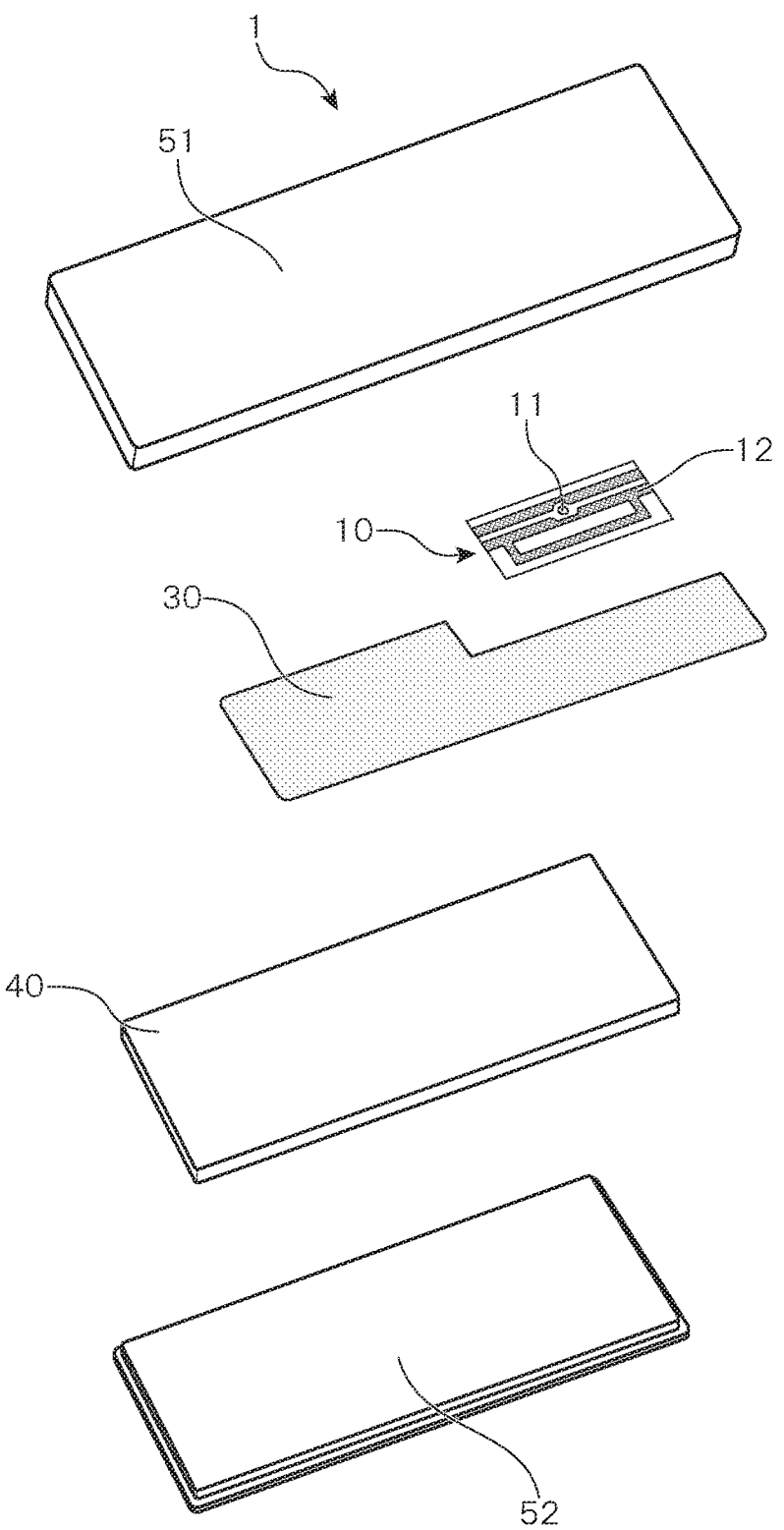
FIG. 9 is a perspective view showing an RF tag according to a second embodiment of the present invention, in a state in which all of a casing, an inlay, an auxiliary antenna and a dielectric constant adjusting plate, constituting the RF tag, are exploded.

FIG. 9 is a perspective view showing an RF tag 1 according to the second embodiment of the present invention, in an exploded state.

As shown in FIG. 9, the RF tag 1 according to the second embodiment is formed into substantially the same configuration as in the RF tag 1 according to the first embodiment to configure an RF tag in which an inlay 10 not having a dipole antenna is accommodated and protected in a casing 50, and a conductor having a cutout is applied as an antenna (auxiliary antenna) to perform radio communication.

A point different from the first embodiment is that the conductor which functions as the antenna of the inlay 10 is applied as an auxiliary antenna 30 to be disposed inside the casing 50 in place of the top cover 20 to be disposed on the surface of the casing 50.

Hereinafter, the configuration in the second embodiment will be described while incorporating the description by affixing the same symbol to the same part as in the first embodiment.

Specifically, as shown in FIG. 9, the RF tag 1 according to the present embodiment is formed into the configuration having: the inlay 10 having the IC chip 11 and the loop circuit antenna 12, and not having the dipole antenna; the planar auxiliary antenna 30 to be laminated to the inlay 10 in the insulated state; the dielectric constant adjusting plate 40 which serves as the substrate on which the inlay 10 and the auxiliary antenna 30 are mounted, and functions as a dielectric constant adjusting layer relative to the inlay 10 mounted thereon; and the casing 50 for accommodating the dielectric constant adjusting plate 40 mounted with the inlay 10 and the auxiliary antenna 30 therein. It should be noted that, in the embodiment shown in FIG. 9, the auxiliary antenna 30 and the inlay 10 are configured to be mounted and laminated thereon in this order on the top surface of the dielectric constant adjusting plate 40, but the inlay 10 is mounted on the dielectric constant adjusting plate 40, and then the auxiliary antenna 30 can also be laminated on the top surface of the inlay 10.

It should be noted that the inlay 10 is similar to the inlay 10 of the RF tag 1 shown in FIGS. 1(a) to 8.

[Auxiliary Antenna]

The auxiliary antenna 30 corresponds to the top cover 20 of the RF tag 1 according to the first embodiment.

In this auxiliary antenna 30, a shape, a size and the like can be configured in the same manner as in the top cover 20 except for difference in which the auxiliary antenna 30 is configured of a thin film antenna conductor in place of the top cover 20 formed of the metallic plate. The auxiliary antenna 30 is formed into an L-shape in plan view, having a cutout 31 similar to the cutout 21 of the top cover 20. Then, the inlay 10 (IC chip 11 and loop circuit antenna 12) not having the dipole antenna is configured to be disposed so as to be positioned inside the cutout 31.

Moreover, as shown in FIGS. 10(a), 10(b), 10(c) and 10(d), when a longitudinal length of the auxiliary antenna 30 is large, the auxiliary antenna 30 formed of such a thin film conductor can be folded back on a back surface side of the substrate (dielectric constant adjusting plate 40) on which the auxiliary antenna 30 is laminated.

Such an auxiliary antenna 30 is formed of a planar conductive member to be disposed on one surface side (bottom surface side in the embodiment shown in FIG. 9) of the inlay 10 into the insulated state from the inlay 10 which is resin-sealed with a seal film 13.

More specifically, the inlay 10 is wholly resin-sealed with the seal film 13 into a physically insulated state from the auxiliary antenna 30 formed of the conductive member. Then, the auxiliary antenna 30 and the IC chip 11 of the inlay 10 are disposed with facing each other through the seal film 13 by directly laminating such an auxiliary antenna 30 on the inlay 10, and are electrically connected by so-called capacitor coupling.

Thus, the auxiliary antenna 30 is laminated on the inlay 10 in a longitudinal direction (height direction), whereby a two-dimensional antenna is configured by the loop circuit antenna 12 and the auxiliary antenna 30 of the inlay 10. Thus, the auxiliary antenna 30 is to function as a booster of the communication radio wave, and the communication characteristics of the inlay 10 are adjusted and improved.

Here, the auxiliary antenna 30 can be formed by forming a metallic thin film having electrical conductivity into a prescribed shape and size (length, area) by punching and cutting or the like using a Thomson blade, for example. Moreover, the auxiliary antenna 30 can also be formed by etching, pattern printing, or the like.

Moreover, as shown in 9, 10(a), 10(b), 10(c) and 10(d), in the auxiliary antenna 30, the longitudinal length can be formed to be larger than a longitudinal length of the dielectric constant adjusting plate 40 serving as the substrate.

Then, as shown in FIGS. 10(a) to 10(d), at least one longitudinal end portion which is longer than the dielectric constant adjusting plate 40 of the auxiliary antenna 30 is configured to be folded back on a back surface side of the inlay 10 on which the auxiliary antenna 30 is laminated.

Here, in the auxiliary antenna 30 formed of the metallic thin film, as an antenna length is longer, the communication characteristics are improved. Therefore, the auxiliary antenna 30 is preferably formed into a length of approximately ½ wavelength of the communication radio wave in the longitudinal length.

On the other hand, if the overall length of the RF tag 1 is adjusted to the ½ wavelength of the communication radio wave according to the length of the auxiliary antenna 30, for example, the dimension becomes excessively long (excessively large), which is not preferable in the properties of the RF tag in which size reduction is requested.

Consequently, in the present embodiment, a length of the long side of the auxiliary antenna 30 is first formed to be the length of approximately ½ of the wavelength of the radio frequency used for radiocommunication in the same manner as in the top cover 20 according to the first embodiment.

Moreover, the dielectric constant adjusting plate 40 serving as the substrate of the auxiliary antenna 30 is formed to be shorter than the length of the long side of the auxiliary antenna 30, namely, the length of approximately ½ of the wavelength of the radio frequency.

Furthermore, as shown in FIGS. 10(a), 10(b), 10(c) and 10(d), at least one longitudinal end portion which becomes longer than the dielectric constant adjusting plate 40 of the auxiliary antenna 30, namely, either of or both of longitudinal ends are configured to be folded (folded back) on a back surface side of the dielectric constant adjusting plate 40 on which the auxiliary antenna 30 is laminated.

In an example shown in FIG. 9, in a state in which the inlay 10 and the auxiliary antenna 30 are laminated on the dielectric constant adjusting plate 40 serving as the substrate, one end portion 30a of the auxiliary antenna 30 is disposed so as to protrude from one longitudinal end side of the dielectric constant adjusting plate 40, and this protruding end portion 30a is configured to be folded back on the back surface side of the dielectric constant adjusting plate 40.

Thus, the auxiliary antenna 30 is formed at the length of approximately ½ wavelength in corresponding to the communication radio wave of the inlay 10. Thus, while favorable communication characteristics are obtained, the end portion of the auxiliary antenna 30 is folded back. Thus, a length of the RF tag 1 can be shortened than the length of ½ wavelength to be able to respond also to a request of size reduction of the RF tag 1.

It should be noted that an electric current which flows into the auxiliary antenna 30 upon reading and writing data relative to the inlay 10 flows only into a peripheral part of the planar auxiliary antenna 30 (skin effect).

Consequently, although not shown, in particular, if the auxiliary antenna 30 has a rectangular and planar peripheral external shape extending in the longitudinal direction, a planar part can be formed into a mesh (reticulation) shape, a lattice shape or the like. The function as the antenna is not adversely affected by the skin effect by forming the auxiliary antenna 30 into the mesh shape or the like in this way, and an area of a conductor part of the whole of the auxiliary antenna 30 can be reduced, a conductive material such as the conductive ink which forms the auxiliary antenna 30 and the like can be saved, and further cost reduction of the RF tag 1 can be achieved.

Other configurations and functions of the auxiliary antenna 30 as described above are the same as in the case of the auxiliary antenna configured of the top cover 20 according to the above-described first embodiment

[Casing and Dielectric Constant Adjusting Plate]

The casing 50 accommodates the above-described inlay 10 therein in substantially the same manner as in the casing 50 according to the first embodiment. Thus, the dielectric constant adjusting plate 40 which is the protective means for protecting the inlay 10 and mounts the inlay 10 inside the casing is configured to be accommodated therein in a detachable manner.

The inlay 10 is protected by this casing 50 to enhance weather resistance, heat resistance, waterproofness and the like as the RF tag.

It should be noted that when the RF tag 1 according to the present embodiment is used as the RF tag to be used indoors or the like without the physical forces, a change in the external environment or the like, such as the shocks, the pressure and moisture from outside, and the like, the RF tag 1 can also be configured of the inlay 10, the auxiliary antenna 30 and the substrate (dielectric instant adjusting plate 40) only by omitting the casing 50.

Figure 10:
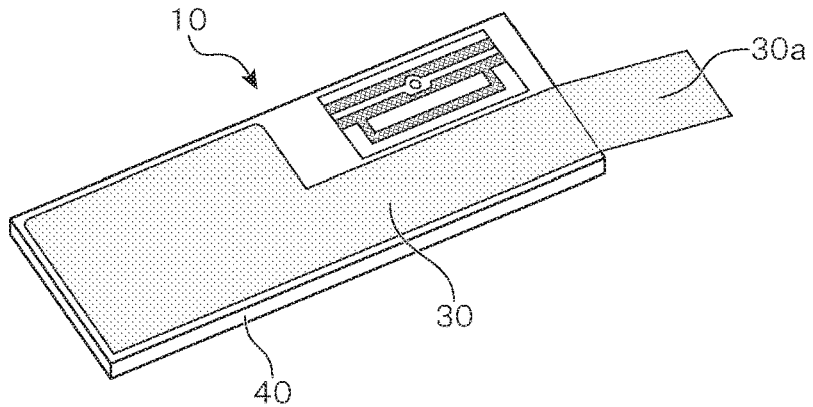
FIGS. 10(a) to 10(c) are a perspective view showing a procedure according to which the inlay and the auxiliary antenna in the RF tag shown in FIG. 9 are mounted and laminated on a dielectric constant adjusting plate.
FIG. 10(d) is a perspective view showing the dielectric constant adjusting plate on which the inlay and the auxiliary antenna are laminated, shown in FIG. 10(c), are viewed from a bottom surface side.
Figure 10:
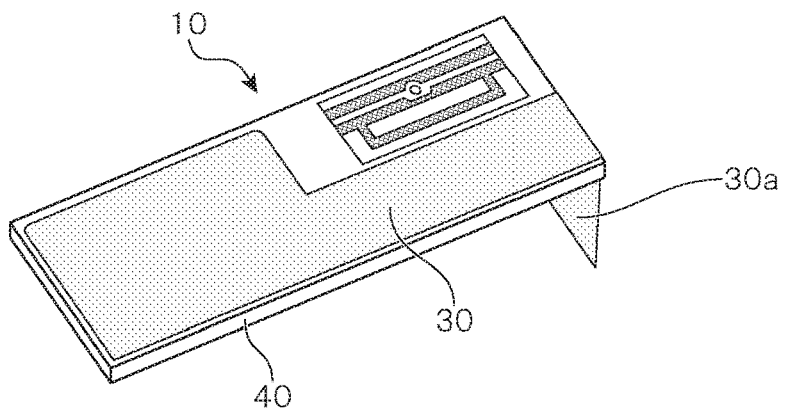
Figure 10:
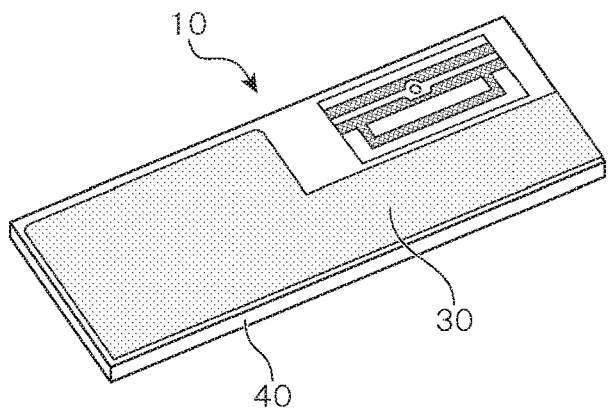
Figure 10:
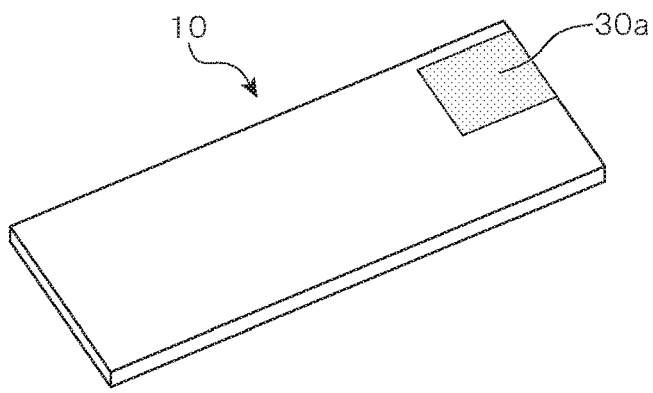

Specifically, as shown in FIGS. 9, 10(*a*), 10(*b*), 10(*c*) and 10(*d*), the casing 50 is wholly formed into a rectangular parallelepiped shape having; a top surface side casing 51 provided with a concave portion (not shown) opening to a casing bottom surface side, serving as a space for accommodating, in an immovable manner, the dielectric constant adjusting plate 40 mounted with the inlay 10 on which the auxiliary antenna 30 is laminated; and a bottom surface side casing 52 covering an opening part of the concave portion of the top surface side casing 51 to close and keep the opening part airtight.

It should be noted that, with regard to the external shape of the casing 50, as long as the dielectric constant adjusting plate 40 mounted with the inlay 10 on which the auxiliary antenna 30 is laminated can be accommodated therein, the shape, the structure, or the like of the external shape can be changed, and for example, the external shape of the casing 50 can be appropriately designed and changed according to the structure or the size of the item in which the RF tag 1 is used, and the use state of the tag or the like.

The dielectric constant adjusting plate 40 is formed of the plate-shaped member which serves as the substrate on which the inlay 10 laminated with the auxiliary antenna 30 is mounted, and functions as the dielectric constant adjusting layer relative to the inlay 10 mounted thereon, and is engaged with the concave portion of the top surface side casing 51 in the detachable and immovable manner to be accommodated in the casing 50. Specifically, as shown in FIGS. 9 and 10, the dielectric constant adjusting plate 40 is formed in a rectangular and plate shape having a width at which the inlay 10 and the auxiliary antenna 30 can be aligned along the longitudinal direction and mounted thereon at a length larger than the inlay 10 to be laminated.

Then, the dielectric constant adjusting plate 40 is disposed so that a longitudinal end portion 30*a* of the auxiliary antenna 30 may be protruded from at least one longitudinal end of this dielectric constant adjusting plate 40. Thus, as shown in FIGS. 10(*a*), 10(*b*), 10(*c*) and 10(*d*), the protruded end portion 30*a* of the auxiliary antenna 30 is to be directly folded back on the back surface side of the dielectric constant adjusting plate 40.

This dielectric constant adjusting plate 40 is engaged with the concave portion of the top surface side casing 51 to be held in the immovable manner, and the inlay 10 and the auxiliary antenna 30 are to be accommodated and held in the casing.

The bottom surface side casing 52 is formed into a plate-shaped cover member which fitted into the opening part of the concave portion of the top surface side casing 51 in a state of accommodating and engaging with the dielectric constant adjusting plate 40 to wholly close the opening of the concave portion.

In the present embodiment, the concave portion of the top surface side casing 51 has a depth for wholly housing the dielectric constant adjusting plate 40 mounted with the inlay 10 and in a state in which the auxiliary antenna 30 is laminated thereon and the end portion is folded back, and further has a depth for just housing the bottom surface side casing 52 by being fitted thereinto in a state in which the bottom surface side casing 52 is stacked with the dielectric constant adjusting plate 40.

Moreover, in the top surface side casing 51, a step portion is formed along an opening rim of the concave portion, and on the other hand, in the bottom surface side casing 52, as shown in FIG. 9, a flange-shaped step portion is formed along a periphery. The step portion of the opening of the top surface side casing 51 and the step portion of the bottom surface side casing 52 are abutted and fitted with each other. Thus, the bottom surface side casing 52 is configured to be substantially the same plane (so-called flush) with the back surface of the top surface side casing 51 in a state in which the opening of the top surface side casing 51 is closed.

The bottom surface side casing 52 fitted and closed in the opening of the top surface side casing 51 is bonded with the top surface side casing 51, for example, by the ultrasonic fusion, the thermal fusion, the adhesive, or the like, and the casing 50 is kept aright and sealed from outside.

Then, in a state in which the top surface side casing 51 is kept airtight by the bottom surface side casing 52, the casing 50 is mounted to the item and the object in which the RF tag 1 is used, for example, by the adhesive, screwing, or the like, or installed and fitted into a prescribed place of the item and the object, whereby the casing 50 is used.

A material which forms the casing 50 can be selected from the same material as in the case of the casing 50 according to the first embodiment.

Moreover, a material which forms the dielectric constant adjusting plate 40 can also be selected in the same manner as in the casing 50 according to the present embodiment and the first embodiment.

Also according to the present embodiment, in the same manner as in the case of the first embodiment, the material is excellent in weather resistance, heat resistance, water resistance, or the like, and is easy in formation, processing or the like of the dielectric constant adjusting plate 40 as described later according to the communication characteristics of the inlay 10, and therefore it is preferable to form the casing 50 including the dielectric constant adjusting plate 40, in particular, with the weather-resistant AES resin or the weather-resistant polycarbonate resin.

Moreover, the dielectric constant adjusting plate 40 can be formed into the shape in which the communication characteristics of the inlay 10 on which the auxiliary antenna 30 is laminated have a prescribed dielectric constant. Thus, the dielectric constant adjusting plate 40 is configured to function as the dielectric constant adjusting layer relative to the inlay 10 mounted and laminated on the dielectric constant adjusting plate 40.

For example, the dielectric constant adjusting plate 40 is formed at a prescribed thickness, and one or two or more penetration portions (through-holes) which penetrate through the dielectric constant adjusting plate 40 can be provided in a prescribed place on a mounting surface on which the inlay 10 is mounted.

The dielectric constant adjusting plate 40 is allowed to partly dispose a dielectric in the inlay 10 to be mounted thereon by forming the penetration portion in this way.

Thus, the penetration portion is appropriately formed in the dielectric constant adjusting plate 40 in consideration of various conditions such as a kind and the communication characteristic of the inlay 10 to be used, the material of the casing 50 or the dielectric constant adjusting plate 40, the item in which the RF tag 1 is used, the use environment, an operating frequency band, and the like. Thus, only the dielectric constant adjusting plate 40 is selected and exchanged. Thus, the RF tag 1 can be used for a different item, or allowed to correspond to a different communication frequency.

Positions, shapes, sizes, the number or the like of such penetration portions formed in the dielectric constant adjusting plate 40 can be designed and changed in consideration and elaboration of conditions such as a kind of the resin material which forms the dielectric constant adjusting plate 40 or the casing 50, the communication characteristics and the communication frequency of the inlay 10, the item in which the RF tag 1 is used, the use environment, a use area and the like.

Specifically, for example, the positions, the shapes, the sizes, the number of holes of the penetration portions formed in the dielectric constant adjusting plate 40 become different between a case where both the casing 50 (the top surface side casing 51 and the bottom surface side casing 52) and the dielectric constant adjusting plate 40 are formed of the weather-resistant AES resin, and a case where both the casing 50 (the top surface side casing 51 and the bottom surface side casing 52) and the dielectric constant adjusting plate 40 are formed of the weather polycarbonate resin.

Then, according to the present embodiment, only the resin materials which form the casing 50 (the top surface side casing 51 and the bottom surface side casing 52) and the dielectric constant adjusting plate 40 are different from each other, and others can be formed into identical configuration, shape and dimension.

Moreover, as shown in FIG. 9, the dielectric constant adjusting plate 40 can also be formed into a complete plate shape without the holes or the like without forming the penetration portion as described above. According to such a dielectric constant adjusting plate 40, the dielectric constant adjusting layer (dielectric constant adjusting plate 40) having a prescribed dielectric constant is to be disposed wholly on one surface side relative to the inlay 10. Thus, a design according to which favorable communication characteristics are obtained in the inlay 10 is formed.

Thus, the dielectric constant adjusting plate 40 can be appropriately designed and changed according to the resin material which forms the dielectric constant adjusting plate 40 or the casing 50, the communication characteristics of the inlay 10, the item in which the RF tag 1 is used, the use state or the like, in which the penetration portion can be appropriately provided or no such a penetration portion can be provided at all.

Accordingly, from viewpoints of ease of design and adjustment of the dielectric constant adjusting plate 40 including formation of the penetration portion, stability of the communication characteristics and the like, the dielectric constant adjusting plate 40 is preferably formed of the same resin material as the top surface side casing 51 and the bottom surface side casing 52. Obviously, when optimum communication characteristics as the RF tag 1 are obtained, the dielectric constant adjusting plate 40, and the top surface side casing 51 and the bottom surface side casing 52 can also be formed of a resin material separate from each other.

As described above, according to the RF tag 1 as related to the first and second embodiments of the present invention, the inlay 10 having the IC chip 11 and the loop circuit antenna 12, and not having the dipole antenna is used, and the inlay 10 can be disposed and accommodated, inside the casing 50 serving as the protective means, so as to be positioned inside the cutout 21 (cutout 31) provided in the top cover 20 (auxiliary antenna 30) which functions as the auxiliary antenna.

Thus, even if the physical forces such as the shocks, the pressure and the like are applied to the casing 50 from outside, the inlay 10 thereinside is protected by the casing 50 or the top cover 20, and the inlay 10 does not cause failure, damage and the like by the external forces or shocks. Thus, durability, shack resistance, pressure resistance, and the like as the RF tag can be improved.

Moreover, the casing 50 in which the inlay 10 not having the dipole antenna is protected and accommodated is not subjected to the constraints by the length of the dipole antenna.

Therefore, size reduction and the degree of freedom of design of the casing 50 or the RF tag 1 as a whole are secured, and according to the object in which the RF tag 1 is used or a purpose of use, or the like, a size or a shape of the casing 50, or the like can be optionally designed and changed or the like. Thus, the present invention can be preferably used as the RF tag excellent also in general versatility and extensibility.

Then, according to the first and second embodiments, the top cover 20 to be disposed on the surface of the casing 50 for protecting the inlay 10, or the auxiliary antenna 30 to be disposed and laminated inside the casing 50 is electrically connected with the inlay 10 by so-called capacitor coupling. Thus, the auxiliary antenna 30 can be functioned as the antenna of the inlay 10 not having the dipole antenna.

Thus, even if the inlay 10 does not have the dipole antenna, favorable radio communication can be established through the top cover 20 and the auxiliary antenna 30, and the communication characteristics of the RF tag 1 can be maintained and improved in a favorable state.

Thus, according to the RF tag 1 as related to the present invention, the inlay 10 having the IC chip 11 and only the loop circuit antenna 12 is accommodated in the casing 50. Thus, the top cover 20 or the auxiliary antenna 30 functions as the antenna of the inlay 10 while reliably protecting the IC chip 11 and the loop circuit antenna 12 of the inlay 10 from physical and mechanical external fortes, shocks and the like by the casing 50 or the metal top cover 20. Thus, the radio communication between the inlay 10 and an outside of the casing can be performed in a favorable state.

Accordingly, the present invention can be preferably used, for example, as the RF tag 1 to be mounted to the object or the like such as the pallet and the container for freight and the like to which the physical forces or shocks are applied from outside in many cases, in particular.

As described above, the RF tag according to the present invention is described by showing preferred embodiments, but the RF tag according to the present invention is obviously not limited to the embodiments described above, and various modifications can be obviously made within the scope of the present invention.

For example, in the above-described embodiment, the pallet and the container for freight are exemplified as the item in which the RF tag according to the present invention is used. However, as the item or the object in which the RF tag according to the present invention can be used is not limited to the pallet and the container for freight.

More specifically, as long as the item or the object in which the RF tag is used, and prescribed information and data are read and written through the reader/writer is applied, the RF tag according to the present invention can be applied to any item and object.

INDUSTRIAL APPLICABILITY

The present invention can be preferably used as an RF tag which is used by being mounted on an optional item or object, such as a pallet and a container for freight and the like, and has a structure in which an inlay of the RF tag is accommodated and sealed in a casing or the like in order to enhance durability, shock resistance or the like.

EXPLANATION OF NUMERICAL SYMBOLS

1 RF tag
10 Inlay
11 IC chip
12 Loop circuit antenna
13 Seal film
20 Top cover
21 Cutout
30 Auxiliary antenna
31 Cutout
40 Dielectric constant adjusting plate
50 Casing
51 Top surface side casing
52 Bottom surface side casing
100 Mounting object
101 Screw

The invention claimed is:

1. An RF tag, comprising:
an inlay comprising an IC chip and only a loop circuit antenna, on which the IC chip is mounted, and not comprising another antenna;
a casing for accommodating the inlay therein; and
a planar top cover covering one surface side of the casing, wherein the top cover is formed of a prescribed metallic material, and comprises a cutout opening at two sides adjacent to each other such that the top cover entirely forms an L-shape as viewed in a plane view,
the inlay is entirely sealed with a seal film and disposed in the casing so as to be positioned inside the cutout, and
the top cover is disposed at one side of the inlay to be insulated from the inlay through the seal film and electrically connected to the inlay by capacitor coupling to function as an auxiliary antenna of the inlay.

2. The RF tag according to claim 1,
wherein the cutout is formed at a dimension larger than a dimension of the loop circuit antenna,
the inlay is disposed in the casing so as to be fitted inside the cutout, and
each one side or two sides of the cutout and the inlay are disposed to be in parallel to each other.

3. The RF tag according to claim 1, further comprising a protective member covering a top surface and/or a bottom surface of the inlay in the casing.

4. The RF tag according to claim 3,
wherein the protective member is formed of a heat-resistant sheet.

5. The RF tag according to claim 1,
wherein, when the casing is mounted to a metal mounting target, the casing comprises an insulation means for insulating the top cover from the mounting target.

6. The RF tag according to claim 1,
wherein the casing comprises a concave portion in which the inlay is disposed.

7. The RF tag according to claim 1,
wherein the casing comprises a concave portion in which the IC chip of the inlay is disposed.

8. The RF tag according to claim 1,
wherein the top cover comprises at least one boring portion.

9. The RF tag according to claim 1,
wherein the inlay consists of the IC chip and the loop circuit antenna without any dipole antenna, and
the inlay is disposed inside the cutout of the top cover as viewed in a side view and outside the top cover as viewed in the plane view.

10. An RF tag, comprising:
an inlay comprising an IC chip and only a loop circuit antenna, on which the IC chip is mounted, and not comprising another antenna;
a planar auxiliary antenna; and
a substrate on which the inlay and the auxiliary antenna are disposed,
wherein the auxiliary antenna comprises a cutout opening at two sides adjacent to each other such that the auxiliary antenna entirely forms an L-shape as viewed in a plane view,
the inlay is entirely sealed with a seal film and disposed on a surface of the substrate so as to be positioned inside the cutout, and
the auxiliary antenna is disposed at one side of the inlay to be insulated from the inlay through the seal film and electrically connected to the inlay by capacitor coupling to function as an auxiliary antenna of the inlay.

11. The RF tag according to claim 10, further comprising a casing for accommodating the substrate therein,
wherein the substrate is formed of a prescribed dielectric which functions as a dielectric constant adjusting layer.

12. The RF tag according to claim 10,
wherein the cutout is formed at a dimension larger than a dimension of the loop circuit antenna,
the inlay is disposed on the surface of the substrate so as to be fitted inside the cutout, and
the cutout and each one side or two sides of the inlay are disposed to be in parallel to each other.

13. The RF tag according to claim 10,
wherein a part of the auxiliary antenna disposed on the substrate is folded on a back surface side of the substrate.

14. The RF tag according to claim 1,
wherein the casing includes an upper portion having one surface on which the top cover is mounted and another surface opposed to the one surface, on which the inlay is disposed, such that the inlay and the top cover are positioned to be opposite to each other through the upper portion,
the inlay has a length in a longitudinal direction shorter than that of the cutout to be positioned inside the cutout, and
the top cover is physically insulated from the inlay through the seal film and the cut out is opened toward the inlay to electrically connect the top cover and the inlay through the upper portion.

15. The RF tag according to claim 1,
wherein the casing includes an upper portion having one surface on which a concave portion having an L-shape portion is formed, and another surface on which another concave portion is formed,
the top cover is fitted into the concave portion of the one surface along the L-shape portion as the auxiliary antenna of the inlay, and
the inlay is fitted into the another concave portion of the another surface such that the cutout opening at the two sides of the top cover and two sides of the inlay adjacent to each other are faced through the upper portion.

16. The RF tag according to claim 14,
wherein the top cover has a length in a longitudinal direction shorter than that of a wavelength of radio frequency of the inlay.

17. The RF tag according to claim 10,
wherein the inlay is disposed such that the cutout opening at the two sides of the auxiliary antenna and two sides of the inlay adjacent to each other are faced on the substrate, and
the auxiliary antenna is physically insulated from the inlay through the seal film and the cutout is opened toward the inlay to electrically connect the auxiliary antenna and the inlay.

18. The RF tag according to claim 10,
wherein the auxiliary antenna has a length in a longitudinal direction shorter than that of a wavelength of radio frequency of the inlay.

19. The RF tag according to claim 10,
wherein the inlay consists of the IC chip and the loop circuit antenna without any dipole antenna, and
the inlay is positioned inside the cutout of the auxiliary antenna viewed in a side view and outside the auxiliary antenna as viewed in the plane view.

* * * * *